(12) United States Patent
Tomono et al.

(10) Patent No.: US 10,936,939 B2
(45) Date of Patent: Mar. 2, 2021

(54) OPERATION PROCESSING APPARATUS, INFORMATION PROCESSING APPARATUS AND INFORMATION PROCESSING METHOD

(71) Applicant: FUJITSU LIMITED, Kawasaki (JP)

(72) Inventors: Mitsuru Tomono, Higashimurayama (JP); Makiko Ito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 170 days.

(21) Appl. No.: 16/275,383

(22) Filed: Feb. 14, 2019

(65) Prior Publication Data

US 2019/0266473 A1 Aug. 29, 2019

(30) Foreign Application Priority Data

Feb. 27, 2018 (JP) .............................. JP2018-033037

(51) Int. Cl.
*G06N 3/04* (2006.01)
*G06N 3/08* (2006.01)
*G06F 7/544* (2006.01)
*G06F 17/18* (2006.01)
*G06F 7/499* (2006.01)

(52) U.S. Cl.
CPC .............. *G06N 3/04* (2013.01); *G06F 7/499* (2013.01); *G06F 7/49942* (2013.01); *G06F 7/5443* (2013.01); *G06F 17/18* (2013.01); *G06N 3/084* (2013.01)

(58) Field of Classification Search
CPC .......... G06N 3/04; G06N 3/084; G06N 3/063; G06F 7/5443; G06F 7/499; G06F 7/49942

USPC ......................................................... 708/603
See application file for complete search history.

(56) References Cited

U.S. PATENT DOCUMENTS

| 2012/0079253 | A1 | 3/2012 | Wiedemeier et al. |
| 2019/0114142 | A1* | 4/2019 | Yoda .................. G06F 11/3452 |
| 2019/0339939 | A1* | 11/2019 | Ito ........................... G06F 7/507 |

FOREIGN PATENT DOCUMENTS

| JP | 60-220423 | 11/1985 |
| JP | 2009-271598 | 11/2009 |
| JP | 2012-203566 | 10/2012 |
| JP | 2013-543173 | 11/2013 |

OTHER PUBLICATIONS

M. Courbariaux et al., "Training Deep Neural Networks With Low Precision Multiplications", Accepted as a workshop contribution at ICLR 2015, International Conference on Learning Representations (ICLR), pp. 1-10, Sep. 23, 2015 (10 pages).

* cited by examiner

*Primary Examiner* — Tan V Mai
(74) *Attorney, Agent, or Firm* — Fujitsu Patent Center

(57) ABSTRACT

An operation processing apparatus includes a memory and a processor coupled to the memory. The processor executes an operation according to an operation instruction, acquires statistical information for a distribution of bits in fixed point data after an execution of an operation for the fixed point data according to an acquisition instruction, and outputs the statistical information to a register designated by the acquisition instruction.

13 Claims, 35 Drawing Sheets

FIG. 7

| Format | Prop. | Up. | PI MNIST | MNIST | CIFAR-10 | SVHN |
|---|---|---|---|---|---|---|
| Goodfellow et al. (2013a) | 32 | 32 | 0.94% | 0.45% | 11.68% | 2.47% |
| Single precision floating point | 32 | 32 | 1.05% | 0.51% | 14.05% | 2.71% |
| Half precision floating point | 16 | 16 | 1.10% | 0.51% | 14.14% | 3.02% |
| Fixed point | 20 | 20 | 1.39% | 0.57% | 15.98% | 2.97% |
| Dynamic fixed point | 10 | 12 | 1.28% | 0.59% | 14.82% | 4.95% |

FIG. 33

COMMAND EXAMPLE

```
         imm    src      dst
cls_cnt  bit#,  vReg #,  vReg #
```

ASSEMBLY IMAGE (2)

```
vlsb   a[0], vReg [11]                        # STORE COEFFICIENT DATA

# MULTIPLY-ACCUMULATE OPERATION LOOP/
FOR_LOOP1:
  vlsbi  a[1], vReg [10]                      # LOAD OPERATION DATA
  mac    vReg [10], vReg [11]                 # STATISTICAL INFORMATION
  loop   FOR_LOOP1, 4095                      #   IS NOT ACQUIRED

# ACQUIRE RESULT OF MULTIPLY-ACCUMULATE
  OPERATION AND STORE ACQUIRED RESULT IN MEMORY
  vlsbi  a[1], vReg [10 ]                     # STATISTICAL INFORMATION
  mac    vReg [10], vReg [11]                 #   IS NOT ACQUIRED

# ACQUIRE STATISTICAL INFORMATION OF ACC0~ACC7
  cls_cnt  0, vReg [0], vReg [0]              # STORE CLS[0] ~ CLS[3]  IN vReg [0]
  cls_cnt  4, vReg [1], vReg [1]              # STORE CLS[4] ~ CLS[7]  IN vReg [1]
              ⋮
  cls_cnt  36, vReg [9], vReg [9]             # STORE CLS[36] ~ CLS[39]  IN vReg [9]

vsacc  a[2]                                 # STORE MULTIPLY-ACCUMULATE RESULT
```

PROCESSING A

PROCESSING B

OPERATION PROCESSING APPARATUS, INFORMATION PROCESSING APPARATUS AND INFORMATION PROCESSING METHOD

CROSS-REFERENCE TO RELATED APPLICATIONS

This application is based upon and claims the benefit of priority of the prior Japanese Patent Application No. 2018-033037, filed on Feb. 27, 2018, the entire contents of which are incorporated herein by reference.

FIELD

The embodiments discussed herein are related to an operation processing apparatus, an information processing apparatus including the operation processing apparatus, and an information processing method.

BACKGROUND

Today, the need for deep learning (DL) is particularly increased among the machine learning using artificial intelligence. The DL may refer to a method of machine learning using a multi-layer neural network (deep neural network (DNN)). FIG. 1 is a diagram illustrating an example of a configuration of a neural network. The neural network is obtained by modelling the nerve cells (neurons) on a computer. The nerve cell includes a cell body, dendrites that receive a signal input from another cell body, and an axon that outputs a signal to another cell body. Further, a signal transferring structure, which is called synapse, is formed between a distal end of the axon that outputs a signal and the dendrite that receives a signal. In the neural network, information transmission through the synapse between the nerve cells is modelled.

In the multi-layer neural network in which the neural network is multilayered, the DL is executed. Further, in order to improve recognition accuracy of the multi-layer neural network in which the DL is executed, the multi-layer neural network tends to have a large scale. For example, the number of parameters processed in the multi-layer neural network ranges from several millions to one hundred and several tens of millions. In order for the multi-layer neural network to reach the human brain, it is considered that the number of parameters ultimately reaches as many as 10,000 billion. Accordingly, in the future, training data is increased in the DL, so that it is expected that a calculation load and a memory load are increased in the multi-layer neural network. As a result, the improvement of recognition accuracy and learning efficiency for the continuously increasing training data is required. In order to reduce the load by improving the recognition accuracy and learning efficiency, it is preferable to make the multi-layer neural network light.

However, in the DL, various calculations including a multiplication, a multiply-accumulate operation, and a vector multiplication are executed. However, in the DL, the demand for preciseness of each operation is not strict compared to ordinary operation processing. For example, in the ordinary operation processing, a programmer develops a computer program so as not to cause overflow as much as possible. In the meantime, in the DL, it is permissible for large values to be saturated to a certain extent. In the DL, adjustment of a coefficient (weight) at the time of convolution operation of a plurality of pieces of input data is the main processing, so that extreme data among the input data is often not regarded as important. Further, in order to adjust the coefficient by repeatedly using the large amount of data, the saturated value is also reflected in the adjustment of coefficient without being saturated by adjusting the digits according to the progress of learning. Accordingly, in consideration of the characteristic of the DL, in order to decrease an area of a chip of an operation processing apparatus for the DL and improve power efficiency, it is conceived to use the calculation by a fixed point number, without using a floating point number because the fixed point calculation may simplify the circuit configuration, compared to the floating point number calculation.

FIG. 2 illustrates a configuration of bits used in data expression. As in a 32-bit floating point number, a 16-bit fixed point number, and an 8-bit fixed point number, the amount of data handled in the multi-layer neural network may be reduced by decreasing a bit width used in data expression of data processed by the DL (weights and parameters). Through the reduction of the amount of data handled, the amount of processing of the DL is decreased, thereby expecting to decrease learning time.

However, since a dynamic range of possible values of fixed point numbers is narrow, calculation preciseness may deteriorate, compared to floating point numbers. In FIG. 3, a relation between the processing performed by a 32-bit floating point number, a 16-bit fixed point number, and an 8-bit fixed point number and the preciseness of inference is modeled and illustrated. In the drawing, the expression "fixed point number" is described as an "integer". The fixed point number is not limited to an integer. Since the fixed point number may be understood as a binary integer, in the present specification, there is a case where the fixed point number may be referred to as an integer. As illustrated in the drawing, when a bit width is decreased, the preciseness of calculation is expected to deteriorate. When the preciseness of calculation deteriorates, there is a case where the DL may not be executed well. That is, in the DL, the multiply-accumulate operation is repeated several times in a forward direction and a backward direction, so that a calculation result may exceed the dynamic range of the fixed point number. Accordingly, it is desirable to overcome the foregoing problem caused by decreasing the bit width by a technology improving the preciseness of calculation.

In order to consider the problem caused by decreasing the bit width, an order of the DL will be first described. FIG. 4 illustrates a processing order in the DL. Further, FIG. 5 illustrates a forward-direction processing of Conv_1 and a backward direction processing of FC2 in detail in the processing order of FIG. 4. A processing flow of the DL is illustrated in FIG. 4. In the processing of the DL, there exists correct answer data corresponding to each input data. A configuration of a network that executes the DL is determined by a person.

The network receives an input of input data from a left side and propagates a processing result of each layer in a right direction (propagates forward), and compares correct answer data with the result and propagates a difference of the result in a left direction (propagates backward). For example, in the example of FIG. 5, the convolution operation of layer Conv_1 is executed by performing a multiply-accumulate operation of a coefficient $W_{ij}$ on an input parameter $x_j$. When the operation is performed up to the highest layer of the multi-layer neural network (FC2 in FIG. 4), an operation result is compared with the correct answer data and the coefficient of each layer is updated based on the comparison result. By a change of the coefficient ($\Delta W_{ij}$), the neural network is optimized. Further, in the multi-layer neural network, the coefficient may be updated for each 1 data. Also, the multi-layer neural network may simultaneously calculate a plurality of pieces of data (e.g., 256 pieces of data) in parallel and update weight based on a result of averaging the update information of 256 coefficients. In this case, a set of the plurality of pieces of data used in the update of the weight is called a mini batch. When the set of the plurality of pieces of data is processed in parallel to update the weight, the set of the data simultaneously processed in parallel may also be a mini batch.

FIG. 6 illustrates a problem that is caused due to the decrease in the parameter and the bit width of the weight in the DL. The amount of data may be decreased by decreasing the bit width. However, in the DL, the processing illustrated FIG. 4 is repeated several times. For example, when it is assumed that input data is 100,000 pieces of image data and the input data passes the network of FIG. 4 100 times per one input data (one piece of image data) so as to optimize a weight coefficient, the data passes the multi-layer neural network 10,000,000 times. Further, as illustrated in FIG. 5, since the multiply-accumulate operation of the weight and the parameter is executed in each layer, the operation of tens of thousands times is further performed. A position of a digit of the data in this case is illustrated in FIG. 6. According to the progress of the DL from an initial stage to a middle stage and then, an end stage, the position of the digit of the data is misaligned. Accordingly, when the DL is simply continued with the fixed point numbers, significant digits are decreased, so that it is expected that the calculation ultimately fails. Accordingly, even in the DL, there is a demand for the consideration of preciseness, that is, the significant digits that express a small value. Accordingly, a technique is proposed in which the fixed point numbers are expanded.

For example, in the processing performed by a mixed fixed point, a point decimal position unified in the entire program is not used, but a proper decimal point position (represented in Q format) is used for each variable. For example, Q3.12 defines 16 bit data having a 1 digit of sign bit, 3 digits of an integer part, and 12 digits below a decimal point. In the mixed fixed point, the decimal point position, that is, the number of digits of the integer part and the number of digits below the decimal point are treated differently for each variable.

As another example, in the processing performed by a dynamic fixed point, a range of a variable is obtained during the execution, so that a decimal point position is rechecked at a predetermined timing. Accordingly, the mixed fixed point operation and the dynamic fixed point operation may be said to be the addition of an aspect of the floating point operation to the fixed point operation, which is easier to process the operation than the floating point operation.

A digital signal processor (DSP) has also been proposed to have a function of a program that executes the processing by the mixed fixed point operation and the dynamic fixed point operation. For example, there is a DSP that executes an operation with a block shift specification. The operation with the block shift specification performs an operation with a bit width larger than a bit width of a variable, shifts a value from the result of the operation, cuts the value, and stores the value in a register for a variable. In this instruction, the shift amount S at the time of the cutting the value from the result of the operation (e.g., −128 to 127) may be designated by an immediate value/general purpose register. For example, when the DSP executes a instruction of Result=Saturate (((in1(operator)in2)>>S), 16), the DSP shifts the result of the operation by S bits, leaves the lower 16 bits, and saturates the upper bits. In the case of S≥0, the DSP arithmetically right shifts the result of the operation, that is, embeds a sign bit, shifts the sign bit to the right, and deletes the lower bit. In the meantime, in the case of S<0, the DSP arithmetically left shifts the result of the operation, that is, maintains a sign bit, shifts the sign bit to the left, and deletes the lower bit in a complement.

A DSP that executes the output of a block count leading sign (BCLS) has also been proposed. The BCLS output is a function of enabling the DSP to obtain a count leading sign of a result of an operation and record the result in a register. Here, the count leading sign refers to a position of the most significant bit 1 with a positive number (a position of the most significant bit 0 with a negative number). For example, when the DSP executes max (block_count_leading_sign(in1 (operator)in2)−1), the position of the most significant bit 1 with a positive number (a position of the most significant bit 0 with a negative number) is recorded in the register from a result of the operation by the operators of variable in1 and variable in2.

FIG. 7 illustrates a recognition error rate in the case where a single precision floating point, a half precision floating point, a fixed point, and a dynamic fixed point are applied in the DL (see, e.g., Non-Patent Literature 1). Further, in FIG. 7, data of the first row (Goodfellow, et al. (2013)) is an evaluation result of another thesis. Further, in the table of FIG. 7, the term "Prop." represents a bit width at the time of the data propagation in recognition (forward direction) and learning (backward direction). Further, the term "Up." represents a bit width at the time of the update of a weight coefficient. Further, the terms "PI MMIST", "MNIST", "CIFAR-10", and "SVHN" represent the data sets used in the DL.

Related techniques are disclosed in, for example, Japanese Laid-open Patent Publication No. 60-220423, and Japanese National Publication of International Patent Application No. 2013-543173. Related techniques are also disclosed in, for example, Courbariaux, et al., "TRAINING DEEP NEURAL NETWORKS WITH LOWPRECISION MULTIPLICATIONS" accepted as a workshop contribution at ICLR 2015, International Conference on Learning Representations (ICLR), Sep. 23, 2015 (Non-Patent Literature 1).

SUMMARY

According to an aspect of the embodiments, an operation processing apparatus includes a memory and a processor coupled to the memory. The processor executes an operation according to an instruction, acquires statistical information for a distribution of bits in fixed point data after an execution of an operation for the fixed point data according to an acquisition instruction, and outputs the statistical information to a register designated by the acquisition instruction.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 7 is a diagram illustrating a recognition error rate in the case where a single precision floating point number, a half precision floating point number, a fixed point number, a dynamic fixed point number are applied in the deep learning;

FIG. 33 is a diagram illustrating an image of a program by an assembly language that acquires statistical information by a processor circuit of the second embodiment;

DESCRIPTION OF EMBODIMENTS

As described above, a recognition error rate is not greatly increased even in the result of the processing by the dynamic fixed point of the related art. However, in the related art, since the position of the decimal point is adjusted by 1 bit based on an overflow rate, the preciseness of a learning result deteriorates. For example, in the case where the position of the decimal point is adjusted in every learning of k pieces of data, and the position of the decimal point is misaligned by n bits from a proper position, learning progresses n*k times until the position of the decimal point is adjusted to the proper position. As a result, saturated data or underflow data is increased until the position of the decimal point is adjusted to the proper position, and there is a concern that learning may not converge or the preciseness of a learning result may deteriorate.

Hereinafter, an information processing apparatus according to an embodiment will be described with reference to the accompanying drawings. The information processing apparatus executes deep learning.

Comparative Example

Figure 1:
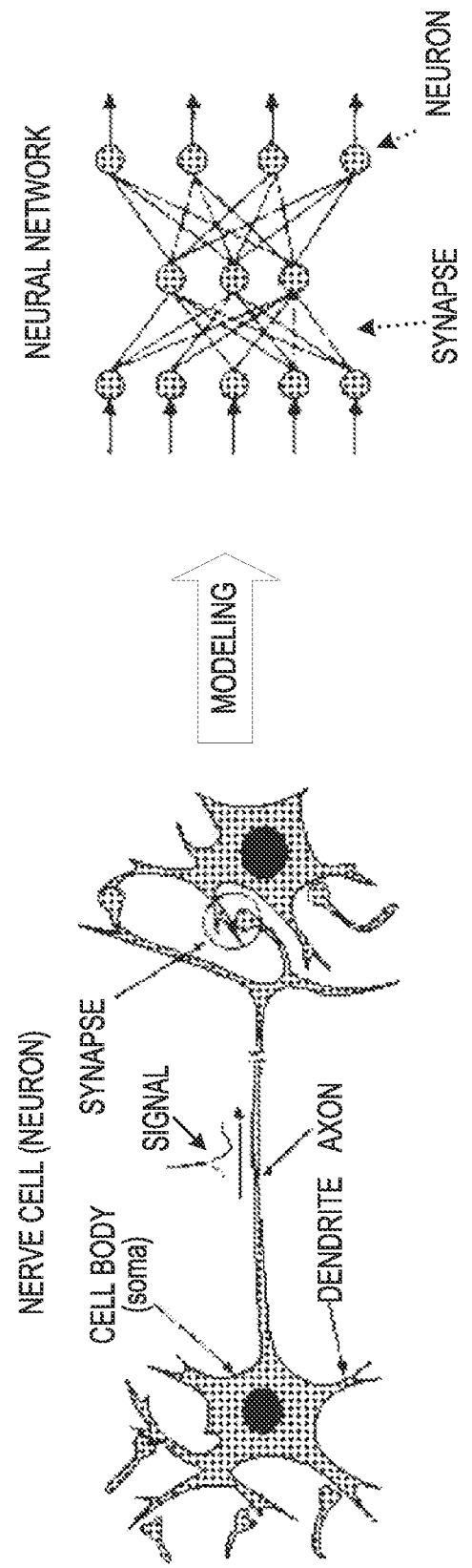
FIG. 1 is a diagram illustrating a configuration of a neural network.
Figure 2:
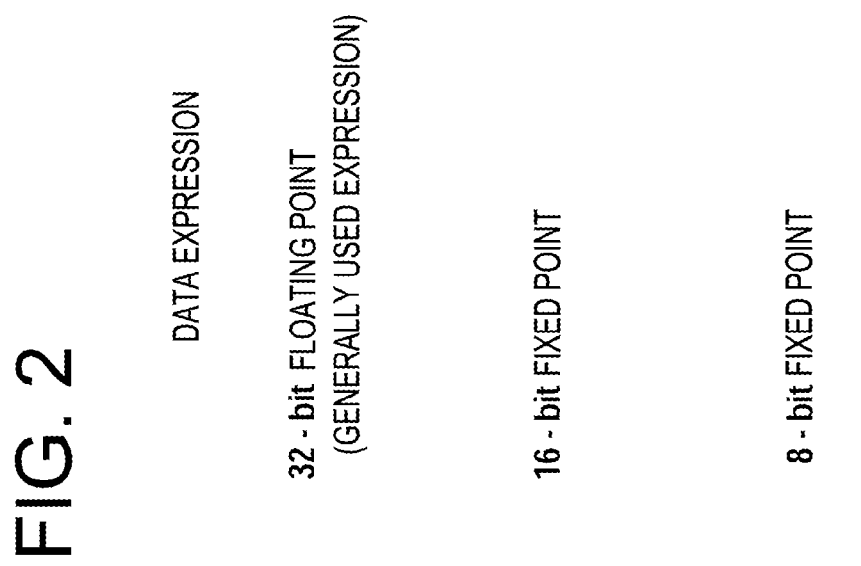
FIG. 2 is a diagram illustrating a configuration of bits used in data expression.
Figure 3:
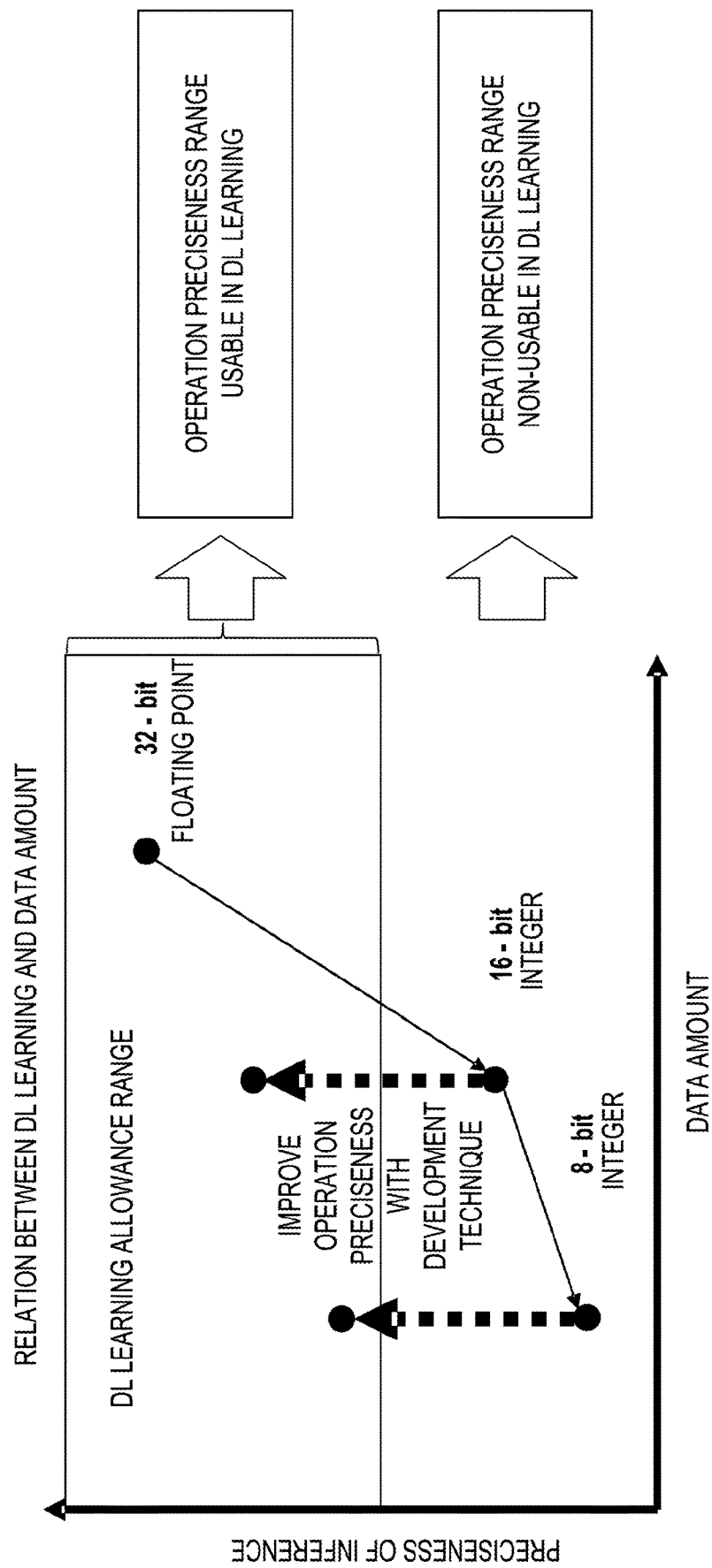
FIG. 3 is a diagram in which the relation between the processing performed by 32-bit floating point number, 16-bit fixed point number, and 8-bit fixed point number and the preciseness of inference is modeled and illustrated.
Figure 4:
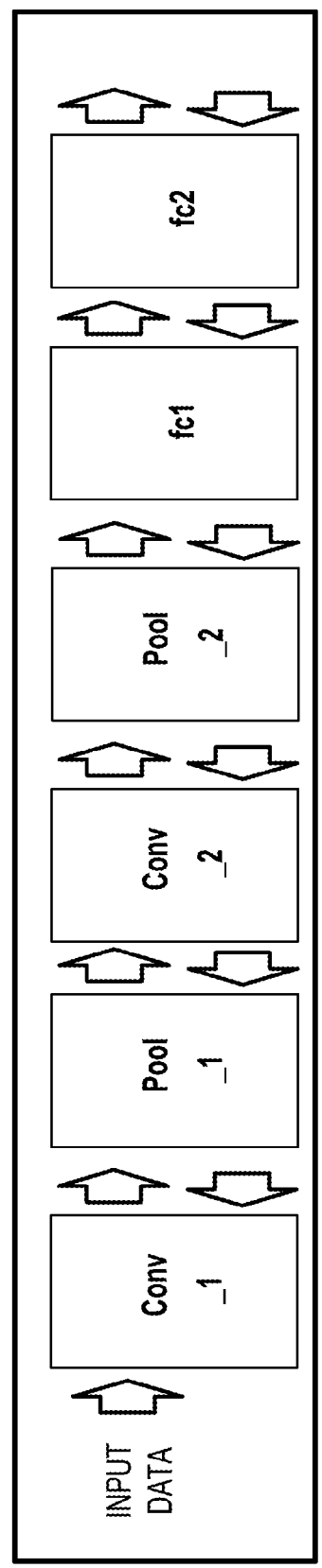
FIG. 4 is a diagram illustrating a processing order in deep learning.
Figure 5:
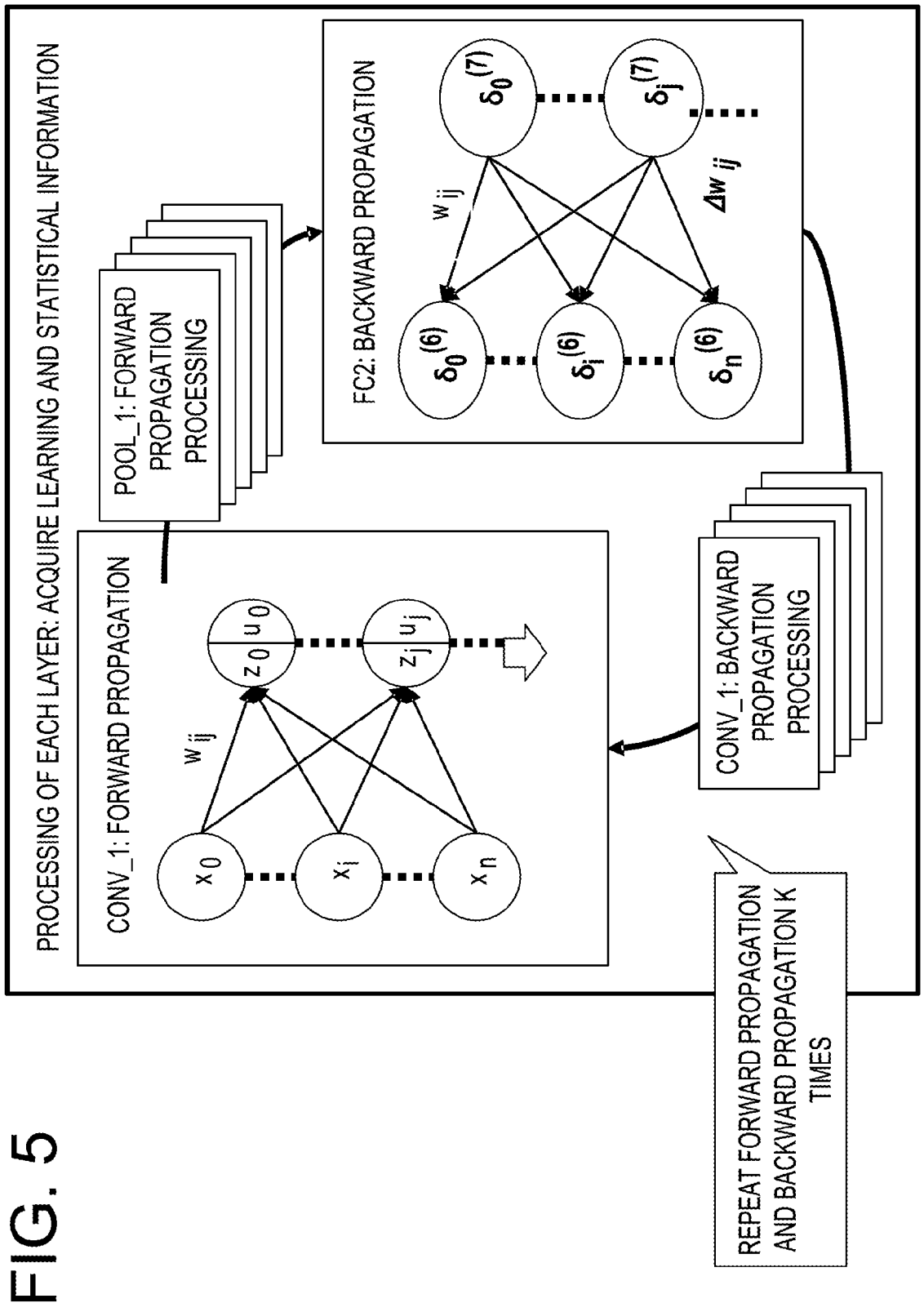
FIG. 5 is a diagram illustrating the processing order of FIG. 4 in detail.
Figure 6:
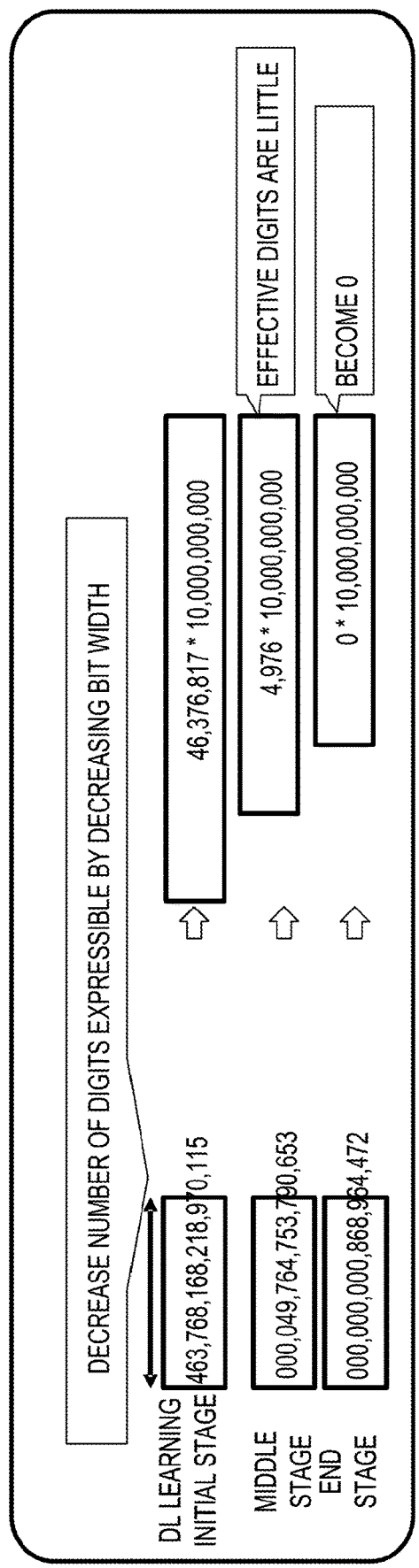
FIG. 6 is a diagram illustrating a problem that is caused due to a decrease in a parameter and a bit width of the weight in the deep learning.
Figure 8:
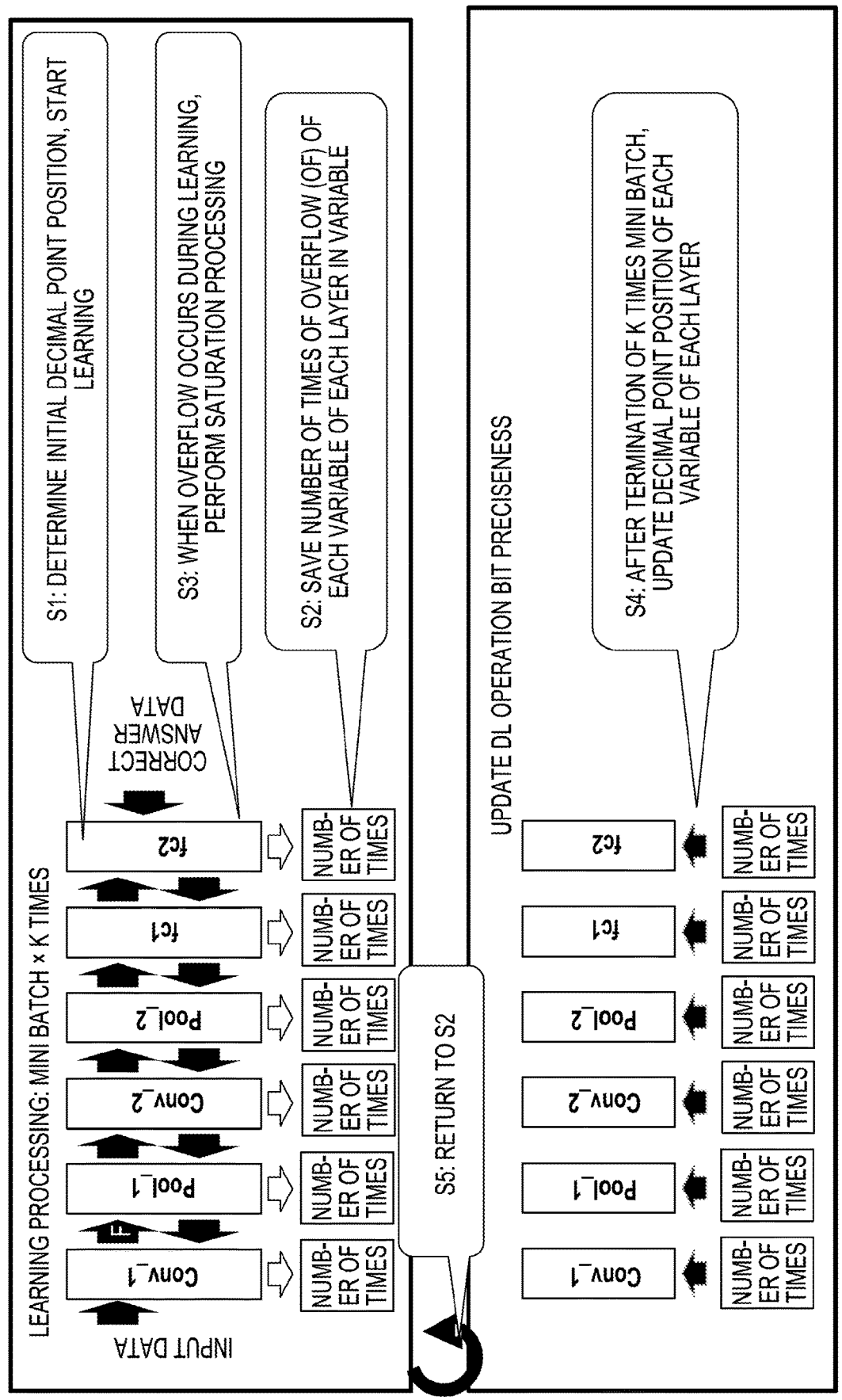
FIG. 8 is a diagram illustrating an order of deep learning according to a Comparative Example.

Deep learning in an information processing apparatus according to a Comparative Example will be described with reference to FIGS. 8 to 10. FIG. 8 is a diagram illustrating an order of deep learning according to the Comparative Example.

As illustrated in FIG. 8, the deep learning of the Comparative Example is executed by a processing of a convolutional layer Conv_1 and a pooling layer Pool_1 of a first layer, a convolutional layer Conv_2 and a pooling layer Pool_2 of a second layer, a fully connected layer 1 (fc1), and a fully connected layer 2 (fc2). The deep learning is divided and executed in a processing unit called a mini batch. Herein, the mini batch refers to a set of input data that is a target for learning {(Ini, Ti), i=1~N}. Further, the mini batch refers to a learning processing unit executed with a set of individual input data (n pieces of data). Herein, the symbol "Ini" is input data (vector) and the symbol "Ti" is correct answer data (vector). As described below, the information processing apparatus of the Comparative Example acquires the number of times of the overflow of each variable of each layer for each mini batch of the predetermined number (k times) during deep learning, accumulates the number of times of the overflow as a variable of the computer program, and automatically adjusts a fixed point position of the variable used in the deep learning.

The information processing apparatus of the Comparative Example determines an initial decimal point position of each variable, for example, by the execution by a floating point number (one mini batch and the like) or designation by a user, and starts learning (S1). Further, the information processing apparatus saves the number of times of the overflow of each variable of each layer as statistical information while learning the mini batch of the k times (S2). In this case, the information processing apparatus determines existence of the overflow, calculates the number of times of the overflow, and substitutes the calculated number of times for a counter variable maintaining the number of times whenever an operation or a substitution is performed on each variable of the program executing the learning.

When the overflow occurs in the variable during the learning of the mini batch, a saturation processing is performed on the variable to continue the learning (S3). Herein, the saturation processing is a processing of clipping to a positive maximum value when a positive number overflows and clipping to a negative minimum value when a negative number overflows.

The information processing apparatus calculates an overflow rate from the number of times of the overflow accumulated in the counter variable after the termination of the mini batch for the k sets of data (after the termination of the k-times learning) and adjusts a decimal point position of a fixed point number based on the overflow rate (S4). Then, the information processing apparatus returns to the processing of S2 and advances the learning.

Figure 9:
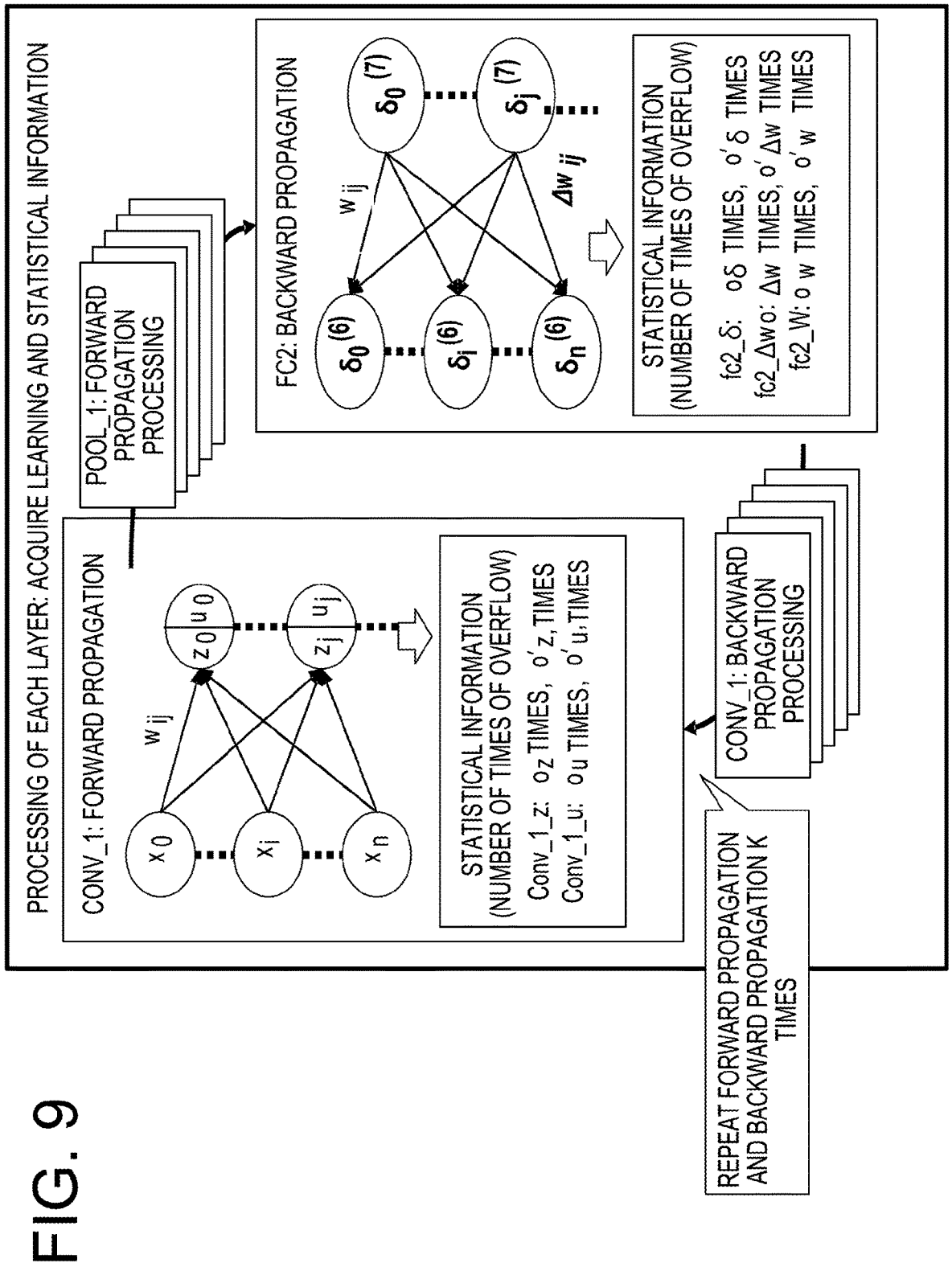
FIG. 9 is a diagram illustrating the processing of each layer of FIG. 8 in detail.

FIG. 9 is a diagram illustrating the processing of each layer of FIG. 8 in detail. In the drawing, a convolution layer Conv_1, a pooling layer Pool_1, and a fully connected layer 2 (fc2) of the first layer are illustrated. In this example, in the convolution layer Conv_1 of the first layer, a convolution operation is executed between input data ini (x0, . . . , and xn) and weight Wij, and z0, . . . , zj, etc. are calculated. Further, for z0, . . . , zj, etc., an activation function is operated, and u0, . . . , uj, etc. are calculated. The information processing apparatus accumulates the number of times of the overflow in the variables z0, . . . , zj, etc. in the convolution layer Conv_1 of the first layer in a counter variable Conv_1_z. Further, the information processing apparatus accumulates the number of times of the overflow in the variables u0, . . . , uj, etc. in the convolution layer Conv_1 of the first layer in a counter variable Conv_1_u. For example, when the counter variable Conv_1_u is an array, the number of overflowed variables among the variables u0, . . . , uj, etc. is accumulated in the counter variable Conv_1_u(1). Further, the number of variables, which overflow when being doubled, among the variables u0, . . . , uj, etc. is accumulated in a counter variable Conv_1_u(2).

A result of the operation in the convolution layer Conv_1 of the first layer is propagated from the pooling layer Pool_1 of the first layer to a further higher layer. In this case, the information processing apparatus executes the same operation and accumulation of the number of times of the overflow even in the second or higher layer. The information processing apparatus executes the operation in the higher layer as well and propagates a result of the operation to the further higher layer. Then, the information processing apparatus finally calculates errors $\delta 0^{(7)}, \ldots, \delta j^{(7)}$, etc. from a difference value between the obtained result of the operation and correct answer data Ti in the fully connected layer 2 (fc2). Then, the information processing apparatus executes the propagation in a backward direction based on the errors $\delta 0^{(7)}, \ldots, \delta j^{(7)}$, etc. As a result, the information processing apparatus calculates a difference value $\Delta Wij$ between errors $\delta 0^{(6)}, \ldots, \delta j^{(6)}$, etc., and $\delta n^{(6)}$ in the output of a lower layer (e.g., the coupling layer 1 (fc1)) and weight of a next time of the variable Wij of the weight. Further, the weight Wij is updated by using the difference value $\Delta Wij$. In this case, the information processing apparatus accumulates the number of times of the overflow in the errors $\delta 0^{(6)}, \ldots, \delta j^{(6)}$, etc., and $\delta n^{(6)}$ in a counter variable fc2_$\delta$. Further, the information processing apparatus accumulates the number of times of the overflow in the difference value $\Delta Wij$ in a counter value fc2_$\Delta W$. Further, the information processing apparatus accumulates the number of times of the overflow in the variable Wij of the weight in a counter value fc2_W. Further, the information processing apparatus accumulates the number of variables, which overflow when being doubled.

The information processing apparatus calculates a difference of the weight while propagating the error in a reverse method from the fully connected layer 1 (fc1) to the convolution layer Conv_1 of the first layer, and updates the weight. The information processing apparatus repeats the forward propagation and the backward propagation k times by using the k sets of input data. The information processing apparatus updates a fixed point position of each variable based on the number of times of the overflow of the counter variable corresponding to each variable after the termination of the k-times learning by the mini batch.

Figure 10:
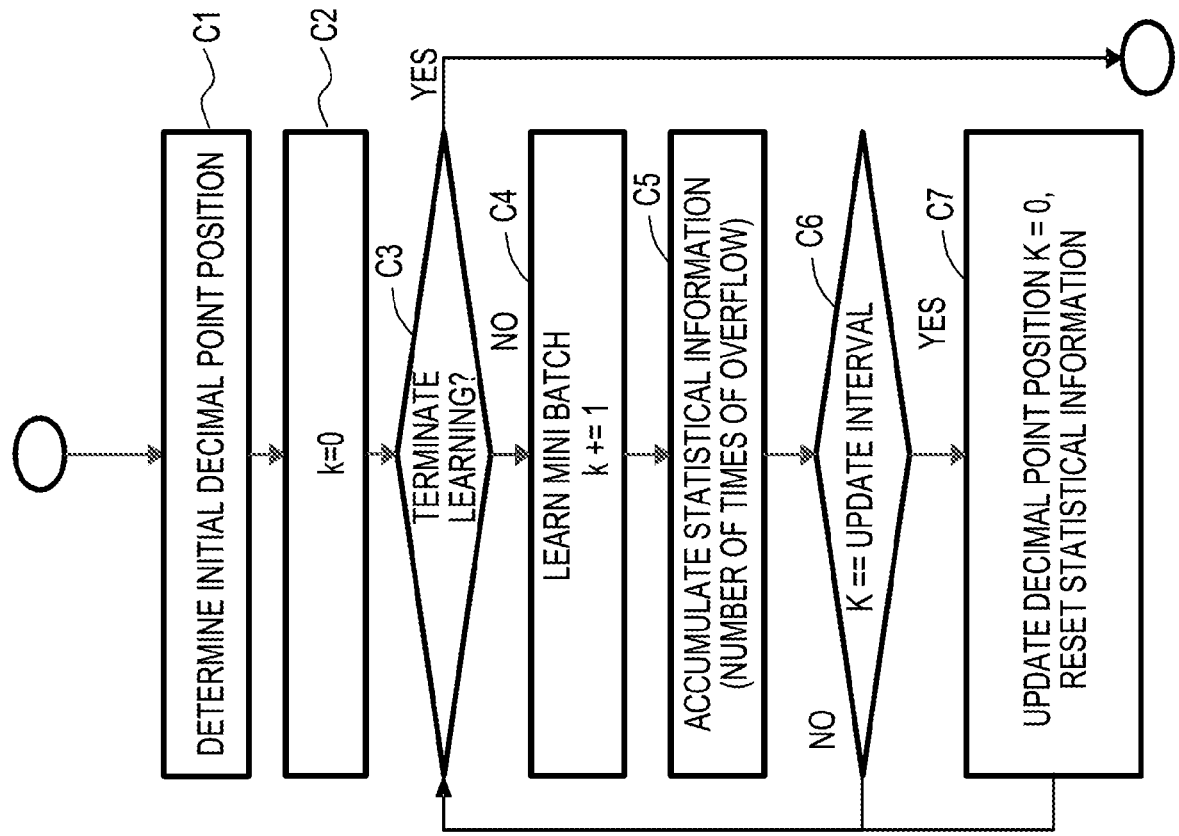
FIG. 10 is a flowchart illustrating learning processing performed by an information processing apparatus of a Comparative Example.

FIG. 10 illustrates a flowchart of learning processing by the information processing apparatus of the Comparative Example. In the processing, the information processing apparatus determines an initial decimal point position (C1). Then, the information processing apparatus initializes the number k of times to value 0. Then, the information processing apparatus determines whether a condition of the termination of the learning is satisfied (C3). The termination of the learning corresponds to the case where an error in the fully connected layer (fc2) is equal to or less than a reference value or the number of times of the learning reaches a specified maximum value.

When the condition of the termination of the learning is not satisfied, the information processing apparatus counts up a variable k by executing a next mini batch (C4). Then, the information processing apparatus accumulates the number of times of the overflow in each counter variable as statistical information (C5). That is, the information processing apparatus accumulates the number of overflowed variables and the number of variables, which overflow when being doubled, in each layer.

The information processing apparatus determines whether the number k of times reaches an update interval (C6). When it is determined that the number k of times does not reach the update interval, the information processing apparatus returns to processing C3. In the meantime, when it is determined that the number k of times reaches the update interval, the information processing apparatus updates the decimal point position according to the number of times of the overflow of the variable. For example, as in non-patent literature 1, the information processing apparatus may calculate the overflow rate by dividing the number of times of the overflow by the number of times of the execution of the operation. Then, when the overflow rate exceeds a specified value, the information processing apparatus may increase an integer part by 1 bit by reducing the decimal point position of the corresponding variable by one. Further, when a value of the twice of the overflow rate is equal to or smaller than the specified value, the information processing apparatus may reduce the integer part by 1 bit by increasing the decimal point position by one. Then, the information processing apparatus 1 returns to processing C3.

However, the foregoing processing is the processing in which the number of times of the overflow is accumulated for each operation of each layer, and the fixed point position is shifted by 1 bit when the overflow rate exceeds the specified value and the value of the twice of the overflow rate is less than the specified value. The processing is the processing of updating the fixed point position based on the number of times of the overflow or the overflow rate. It is difficult for the information processing apparatus to determine an appropriate decimal point position based on the number of times of the overflow or the overflow rate.

Accordingly, the processing of the Comparative Example is a procedure of determining an appropriate position by processing, such as decreasing or increasing the decimal point position by one at the time of updating the fixed point position, and making further determinations based on the result. Accordingly, the decimal point position is updated several times until the information processing apparatus determines the appropriate decimal point position. For example, as described above, when the information processing apparatus determines the overflow rate for each k-time mini batch and updates the decimal point position by 1 bit, N×k times (× is multiplication) mini batch is executed in order to shift the decimal point position by N bits. Because of this, the learning processing is repeated in the state where the decimal point position is inappropriate. That is, during the learning, the saturation or the underflow of the fixed point number data occurs at an undesired level, resulting in deterioration of the preciseness of the learning result, which may lead to a delayed convergence.

The information processing apparatus of the Comparative Example simply executes the processing of acquiring and accumulating the number of times of the overflow during the program of the deep learning, so that there is a possibility in that a learning time may be increased. That is, since the information processing apparatus does not have a function of providing information that determines an appropriate decimal point position to the program, a code that accumulates the number of times of the overflow in the program is assembled, which may lead to an increased processing time.

First Embodiment

Hereinafter, with reference to FIGS. 11 to 32, descriptions will be made on an information processing apparatus 1 according to a first embodiment, an information processing method executed by the information processing apparatus 1, and a program executed by the information processing apparatus 1.

Statistical Information

Figure 12:
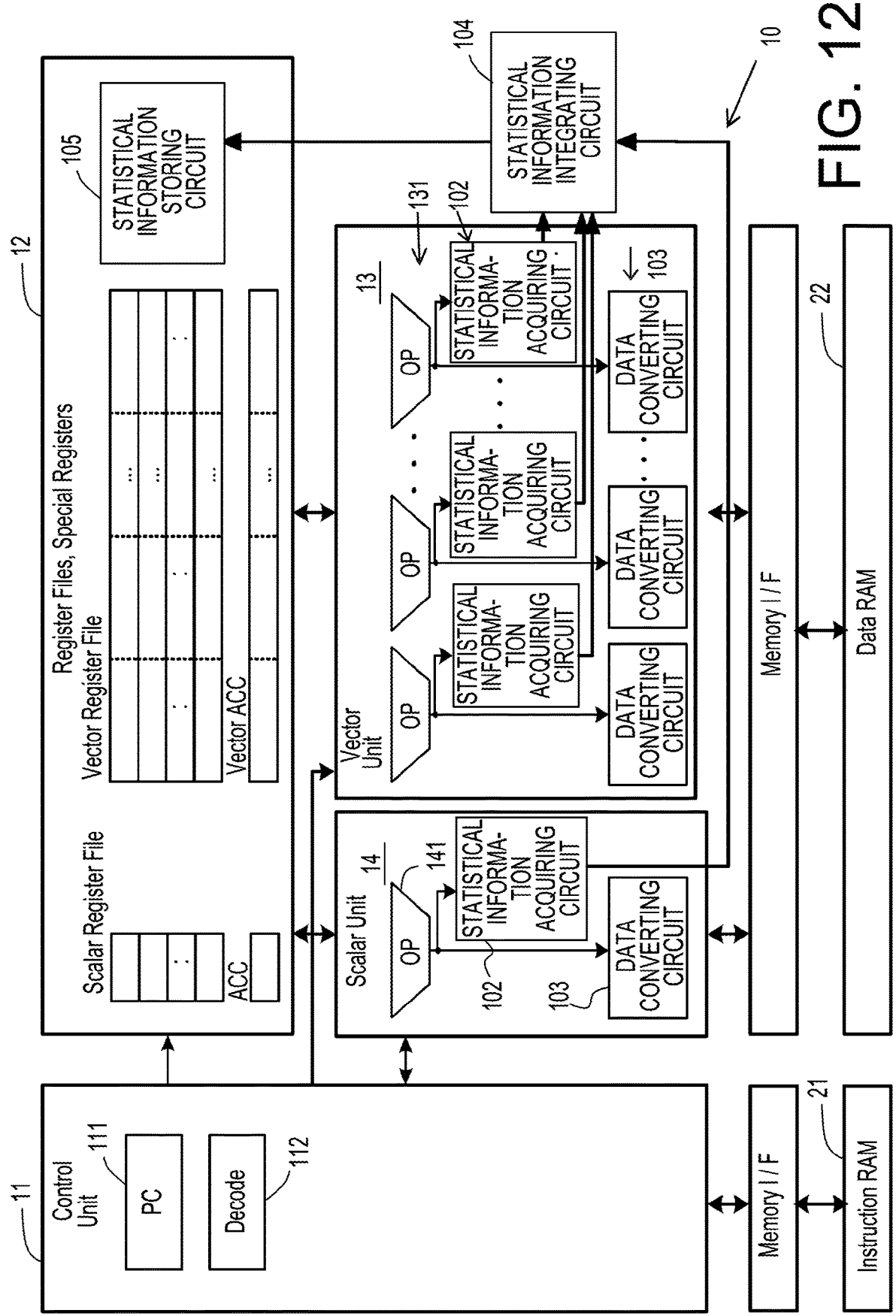
FIG. 12 is a diagram illustrating a circuit block of a processor.

In the first embodiment, a processor 10 of the information processing apparatus 1 illustrated in FIG. 12 acquires statistical information, and an overhead of the program is reduced to acquire the statistical information. Herein, the statistical information acquired by the processor 10 refers to, for example, one of (1) to (4) to be described below, or a combination thereof. An application program executed by the information processing apparatus 1 acquires statistical information from the processor, and optimizes a decimal point position. The processor executes an instruction for the dynamic fixed point operation according to the processing of the application program.

(1) Distribution of Most Significant Bit Position

Figure 11:
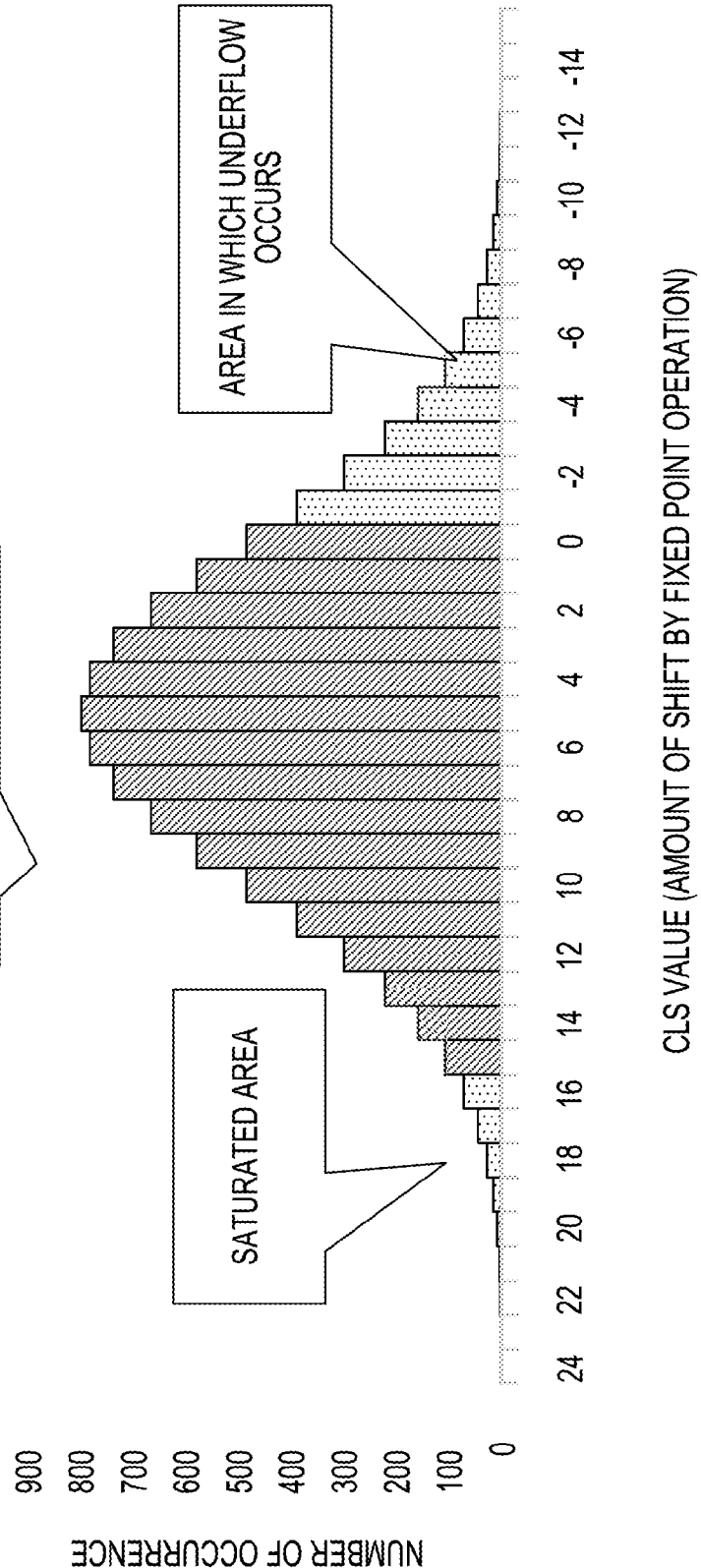
FIG. 11 is a diagram illustrating distribution data of a most significant bit position.

FIG. 11 illustrates distribution data of a most significant bit position. FIG. 11 is an example of data, of which an intermediate result of an operation is 40 bits, and which is right-shifted by 14 bits to adjust the digit of a fixed point number. The most significant bit position refers to the most significant bit position where the bit is 1 for a positive number. Further, the most significant bit position refers to the most significant bit position where the bit is 0 for a negative number. For example, when the bit arrangement is bit[39], which is the highest bit, to bit[0] which is the lowest bit, the most significant bit position refers to the bit[k] in which an index k is the largest among bit[k] different from a sign bit[39]. When the distribution of the most significant bit position is obtained, it is possible to recognize the distribution range of the value as the absolute value.

In FIG. 11, the vertical axis represents the number of occurrence of the most significant bit position, and the horizontal axis is a count leading sign (CLS) of the most significant bit position. In FIG. 11, it is assumed that there is a decimal point at the right side of bit 0. In a first embodiment, an operational circuit of the processor 10 of the information processing apparatus 1 and a register within the operational circuit have a bit width (e.g., 40 bits), which is equal to or larger than the number of bits of the register specified by an operand of an instruction (e.g., 16 bits). However, the bit widths of the operational circuit of the processor 10 of the information processing apparatus 1 and the register within the operational circuit are not limited to 40 bits. Further, the operation result is stored in the register having a smaller bit width than that of the operational circuit (the register specified by the operand of the instruction), for example, the register of 16 bits. As a result, the operation result (e.g., 40 bits) is shifted by the shift amount specified by the operand and the bit corresponding to less than bit 0 is rounding-processed, so that the data having a bit width exceeding the bit width of the register specified by the operand (the data exceeding 15 bits) is saturation-processed.

A numerical value assigned to the horizontal axis of FIG. 11 represents a numerical value, which may be expressed by a fixed point. For example, when the information processing apparatus 1 shifts the fixed point number only by—2 bit (shifts the fixed point number by 2 bits in the right direction), the most significant bit is shifted to the position of 14, and a saturated area is extended by 2 bits, and an area where the underflow occurs and becomes 0 is decreased by 2 bits. That is, when the information processing apparatus 1 shifts the decimal point position by 2 bits to the right, the saturated area is extended by 2 bits, so that the area where the underflow occurs is decreased by 2 bits. Further, for example, when the information processing apparatus shifts the fixed point number only by 2 bits in a plus direction (shifts the fixed point number by 2 bits in the left direction), the most significant bit is shifted to the position of 18, and a saturated area is decreased by 2 bits, and an area where the underflow occurs is extended by 2 bits. That is, when the information processing apparatus 1 shifts the decimal point position by 2 bits to the left, the saturated area is decreased by 2 bits, so that the area where the underflow occurs is increased by 2 bits.

The information processing apparatus 1 obtains the distribution of the most significant bit position during the execution of the learning, so that it is possible to immediately determine an appropriate shift amount, that is, an appropriate fixed point position, in the dynamic fixed point operation. For example, the information processing apparatus 1 may determine a fixed point position so that the saturated data is equal to or less than a designated rate. That is, as an example, the information processing apparatus 1 may determine a fixed point position by prioritizing the case where the saturation of data becomes a predetermined degree over the case where the underflow of data becomes a predetermined degree.

The distribution of the most significant bit position is accumulated in a predetermined register (also referred to as a statistical information register) within the processor 10 (see FIG. 12) of the information processing apparatus 1. The processor 10 executes instructions such as reading the distribution data from the statistical information register, recording the distribution data, and clearing the statistical information register. Accordingly, in the statistical information register, distribution data on one or more fixed point numbers subjected to the execution of the instruction from the execution of the previous clear instruction to the present instruction is accumulated. The accumulated distribution data is read in a memory by the reading instruction. Further, instead of the clearing instruction, the processor 10 may enable the execution of a load instruction to the statistical information register so that the value 0 may be loaded onto the statistical information register.

(2) Distribution of Least Significant Bit Position

The distribution of a least significant bit position refers to the least significant bit position in which a bit has a different value from a sign. For example, when the bit arrangement is from bit[39], which is the highest bit, to bit[0], which is the lowest bit, the least significant bit position refers to the bit[k] in which an index k is the smallest among bit[k] different from a sign bit bit[39]. Further, in the distribution of the least significant bit position, the digit of data is recognized.

(3) Maximum Value of Most Significant Bit Position

A maximum value of a most significant bit position is a maximum value among the most significant bit positions that have different values from the value of the sign bit for one or more fixed point numbers subjected to the execution of the instruction from the execution of the previous clear instruction to the present. The information processing apparatus 1 may use the maximum value of the most significant bit position in determining an appropriate shift amount, that is, an appropriate decimal point position, in the dynamic fixed point operation.

The processor 10 executes instructions, such as reading the maximum value from the statistical information register and clearing the statistical information register. Accordingly, in the statistical information register, the maximum values from the execution of the previous clear instruction to the present are accumulated, so that the maximum value is read into the memory by the read instruction.

(4) Minimum Value of Least Significant Bit Position

A minimum value of a least significant bit position is a minimum value among the least significant bit positions that have different values from the value of the sign bit for one or more fixed point numbers from the execution of the previous clear instruction to the present. The information processing apparatus 1 may use the minimum value of the least significant bit position in determining an appropriate shift amount, that is, an appropriate decimal point position, in the dynamic fixed point operation.

The processor 10 executes instructions, such as reading the minimum value from the statistical information register and clearing. Accordingly, in the statistical information register, the minimum values from the execution of the previous clear instruction to the present are accumulated, so that the minimum value is read into the memory by the read instruction.

FIG. 12 illustrates a circuit block of the information processing apparatus 1 and the processor 10 within the information processing apparatus 1. In FIG. 12, a memory IRAM 21 for instruction and a memory DRAM 22 for data are also illustrated together with the processor 10. The processor 10 includes a control unit 11, a register file 12, a vector unit 13, and a scalar unit 14. The control unit 11 includes a program counter 111 and a decoder 112. The register file includes a vector register file, an accumulator register for a vector operation (vector ACC), a scalar register file, and an accumulator register for a scalar operation (ACC). The vector unit 13 includes a vector operational circuit 131, a statistical information acquiring circuit 102, and a data converting circuit 103. The scalar unit 14 includes a scalar operational circuit 141, the statistical information acquiring circuit 102, and the data converting circuit 103.

In FIG. 12, the processor 10 includes a statistical information integrating circuit 104, which integrates statistical information from a plurality of statistical information acquiring circuits 102. Further, a statistical information storing circuit 105 is included in a portion of the register file 12. Further, the memory 21 for instruction is connected to the control unit 11 through a memory interface (Memory I/F). Further, the memory 22 for data is connected to the vector unit 13 and the scalar unit 14 through the memory interface (Memory I/F).

Figure 13:
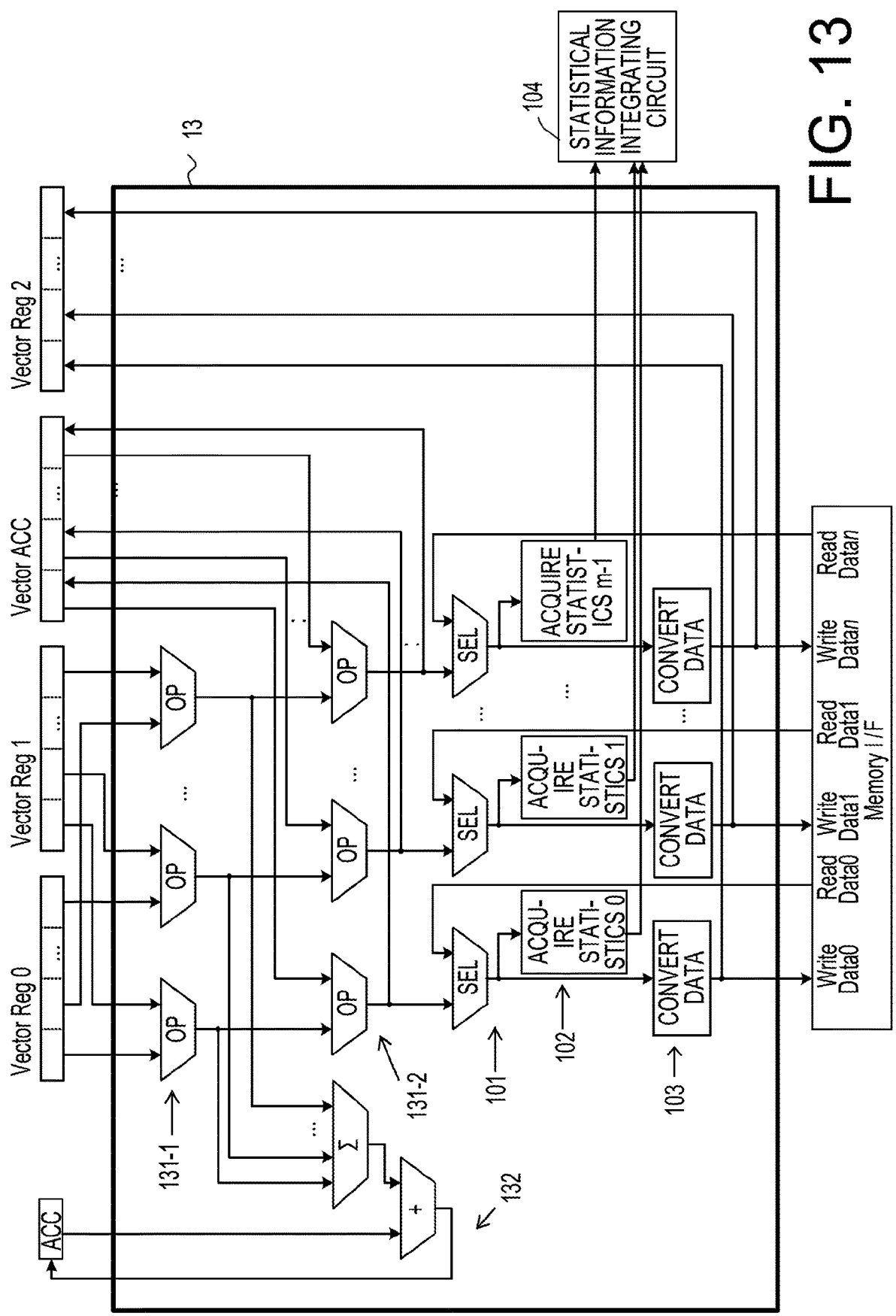
FIG. 13 is a diagram illustrating a vector unit in detail.

FIG. 13 illustrates the vector unit 13 in detail. In the drawing, the statistical information integrating circuit 104 is also illustrated. The vector unit 13 operates data of the vector registers Vector Reg0 and Vector Reg1 in a vector operational circuit 131-1. The operation result of the vector operational circuit 131-1 is input to a multiply-accumulate operation accumulator 132 for and a vector operational circuit 131-2.

The a multiply-accumulate operation accumulator 132 scalar-adds the operation result of the vector operational circuit 131-1 and stores the addition result in the accumulator register ACC for the scalar operation. The vector operational circuit 131-2 outputs the operation result of the vector operational circuit 131-1, the data of the accumulator register for the vector operation (vector ACC), or the result of the addition thereof according to an operation mode specified by the instruction. The accumulator register has a bit width (e.g., 40 bits) that has the number of bits of the vector register file (e.g., 16 bits) or more.

A selector 101 selects any one of the output result of the vector operational circuit 131-2 and the reading result (Read Data 0, . . . , and Read Data 0) from the memory 22 for data, and inputs the selected result to the statistical information acquiring circuit 102 and the data converting circuit 103. The statistical information acquired by the statistical information acquiring circuit 102 is input to the statistical information integrating circuit 104. Further, the data converted by the data converting circuit 103 is stored in the memory 22 for data (Write Data 0, . . . , and Write Data n) or is maintained in the vector register (Vector Reg2) through a selector (not illustrated).

Figure 14:
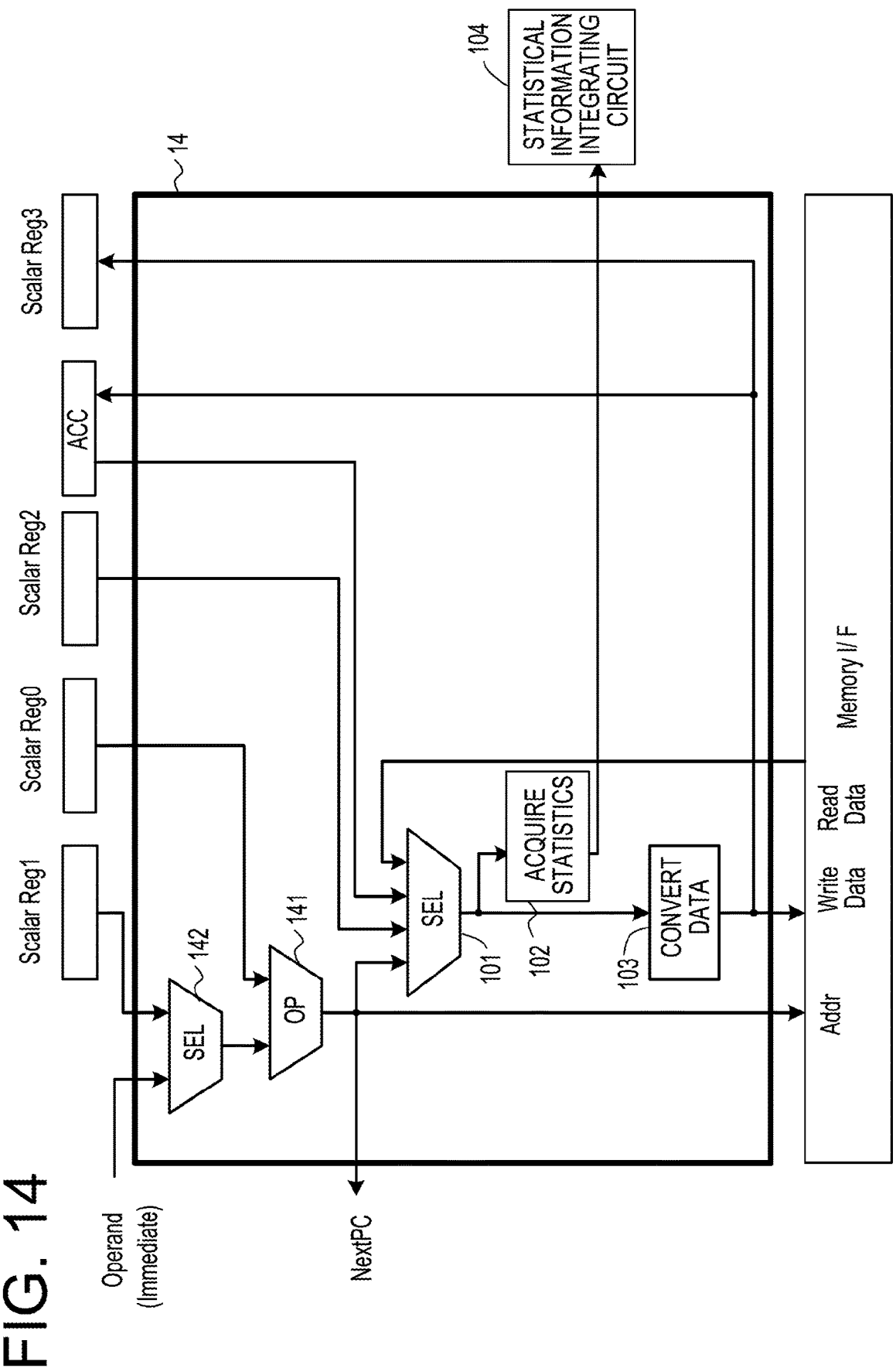
FIG. 14 is a diagram illustrating a configuration of a scalar unit.

FIG. 14 illustrates the configuration of the scalar unit 14. The scalar unit 14 includes a selector 142, which selects one of data obtained by an immediate value operand and data from a scalar register (Scalar Reg1), and a scalar operational circuit 141, which operates the selection result of the selector 142 and the data of the scalar register (Scalar Reg0). An operation result of the scalar operational circuit 141 is stored in an address (e.g., Addr) of the memory 22 for data through the memory interface (Memory I/F). Further, the operation result of the scalar operational circuit 141 is input to the statistical information acquiring circuit 102 and the data converting circuit 103 through the selector 101.

The selector 101 selects one of the operation result of the scalar operational circuit 141, data of the scalar register (Scalar Reg2), the data of the accumulator register ACC for the scalar operation, and data read through the memory interface (Memory I/F) (Read Data). The selector 101 inputs the selected data to the statistical information acquiring circuit 102 and the data converting circuit 103. The statistical information acquiring circuit 102 acquires the statistical information from the data input from the selector 101 and inputs the acquired statistical information to the statistical information integrating circuit 104.

Figure 15:
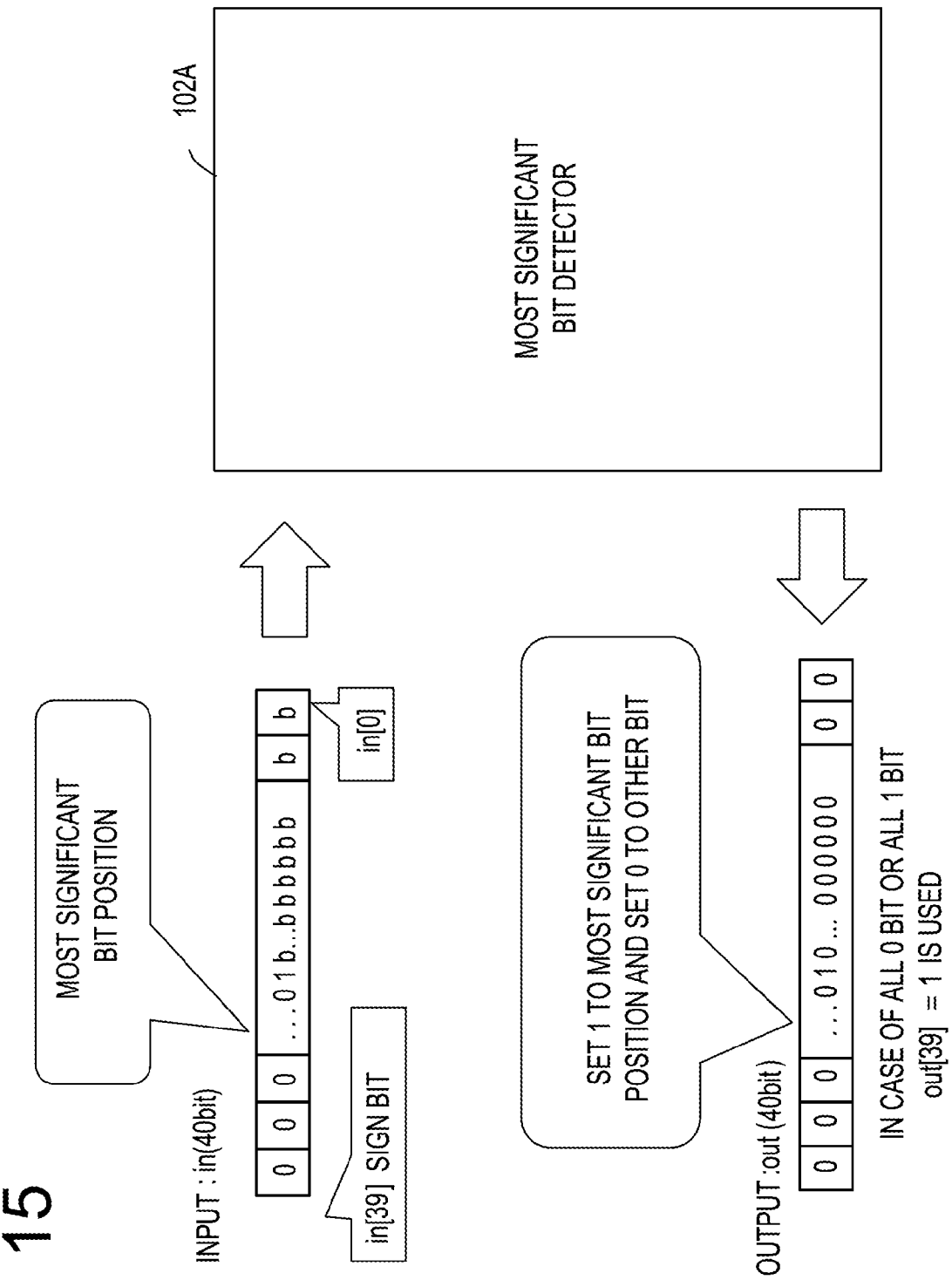
FIG. 15 is a diagram illustrating the processing by a statistical information acquiring circuit, which acquires a position of the most significant bit.

FIG. 15 illustrates a processing of a statistical information acquiring circuit 102A, which acquires the most significant bit position. FIG. 15 illustrates a processing by a most significant bit detector included in the statistical information acquiring circuit 102A. In an example of FIG. 13, input data (in(40 bit) in which a sign bit is 0, a bit at a position indicated as the "most significant bit position" is 1, all of the bits on the higher side from the bit are 0, and the bit lower than the bit is b is illustrated. Herein, b is any one between 0 and 1. The statistical information acquiring circuit 102A processes the input data, and generates output data (out(40 bit) in which the most significant bit position is 1 and other bit positions are 0. When the input data is all the bits of 0 or all the bits of 1, the statistical information acquiring circuit 102A outputs 1 to the $39^{th}$ bit and 0 to the $38^{th}$ bit or less. Further, in the description below, the data of the operational circuit of the processor 10 is illustrated as the data of 40 bits, but the data of the operational circuit of the processor 10 is not limited to the data of 40 bits.

Figure 16:
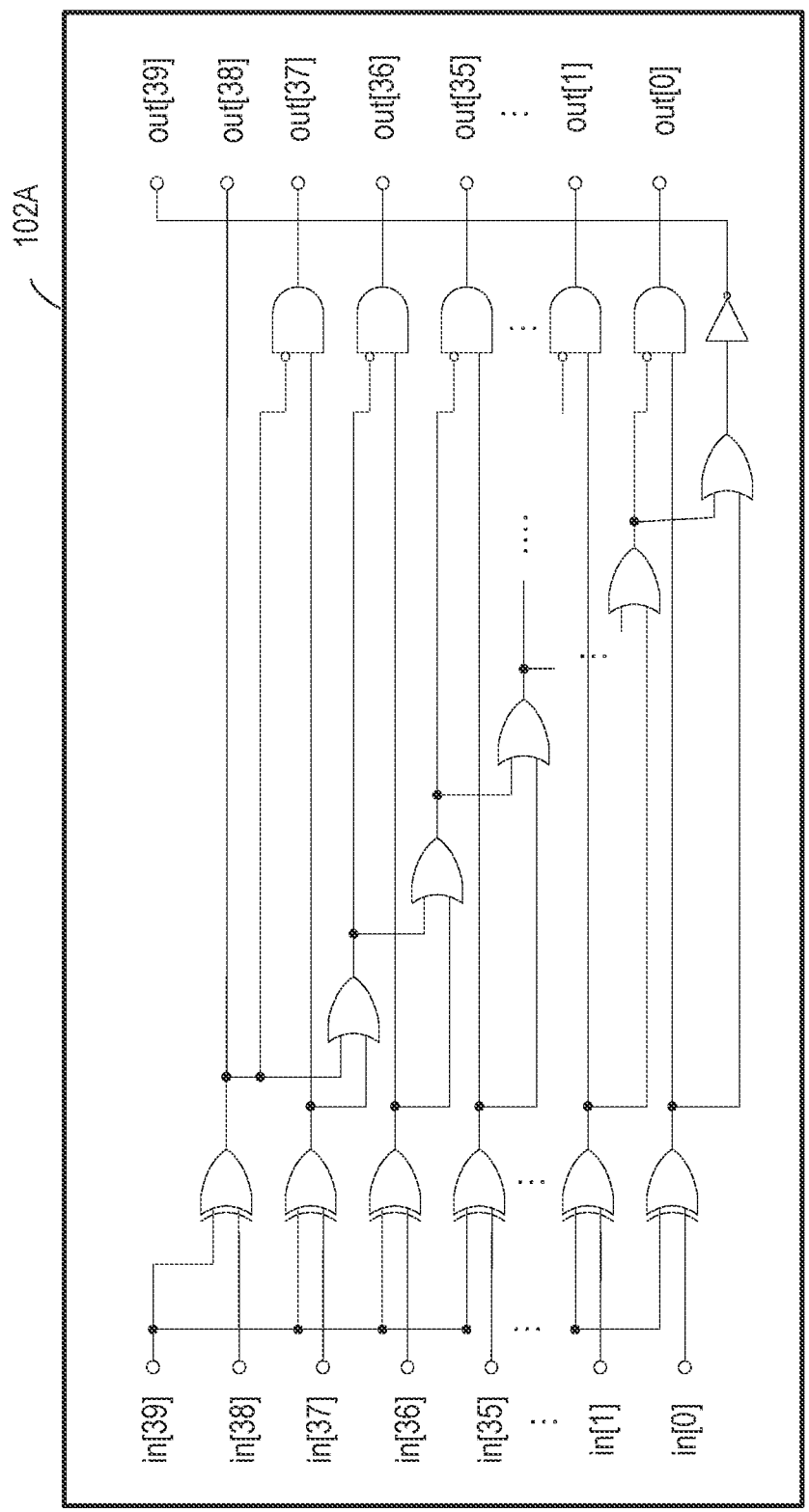
FIG. 16 is a diagram illustrating a configuration of a hardware circuit of the statistical information acquiring circuit, which acquires a position of the most significant bit.

FIG. 16 illustrates a configuration of a hardware circuit of the statistical information acquiring circuit 102A, which acquires the most significant bit position. In this circuit, exclusive OR (EXOR) of a sign bit (in[39] and other bits (from in[38] to in[0]) is executed. Then, the EXOR value by the bit having the same value as the sign bit (in[39]) is 0, and the EXOR value by the bit having a different value from the sign bit (in[39]) is 1.

When in[38] and in[39] have the different values, out[38] of output data is 1 by the EXOR. In the meantime, the EXOR value of in[39] and in[37] is input to out[37] of the output data through an AND gate. Since a bit value obtained by reversing the EXOR value of in[39] and in[38] is input to one input of the AND gate, when in[39] does not match in[38], the output of the AND gate is 0 regardless of the EXOR value of in[39] and in[37]. FIG. 16 is an example of a circuit that sets a flag bit at a position of the most significant bit, which does not match the sign bit in the fixed point data after the execution of the operation.

Figure 17:
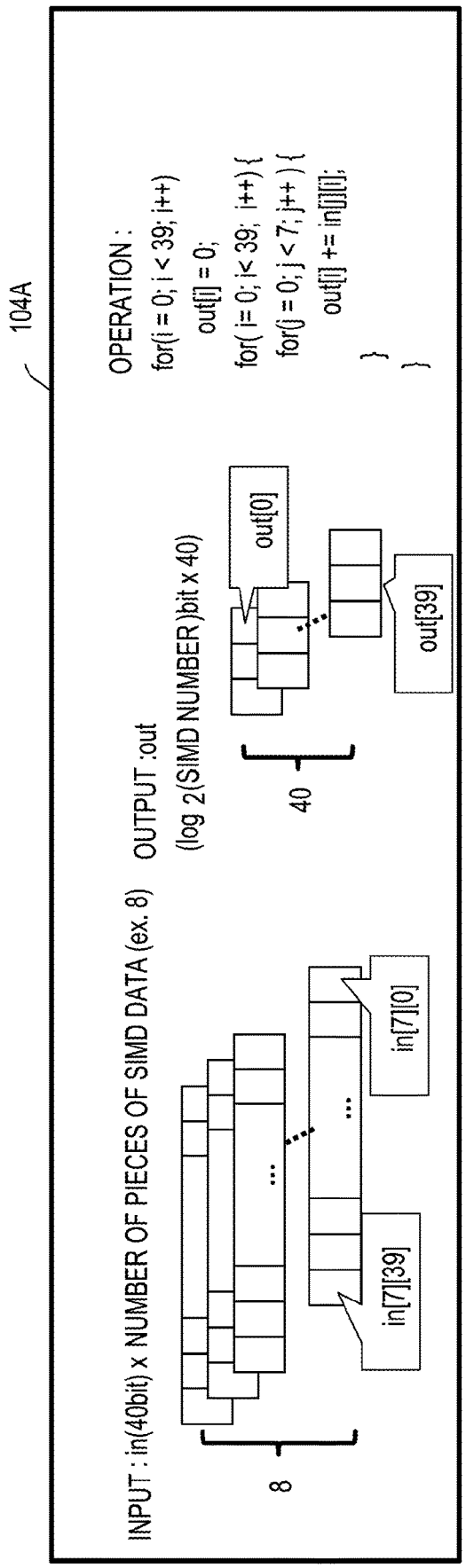
FIG. 17 is a diagram illustrating the processing of a statistical information integrating circuit.

FIG. 17 is a diagram illustrating a processing of the statistical information integrating circuit 104A that acquires the bit distribution from the data acquired by the statistical information acquiring circuit 102. The drawing illustrates the processing of acquiring the bit distribution from single instruction multiple data stream (SIMD) data, in which eight pieces of data of 40 bits are processed in parallel. In FIG. 17, the processing of the statistical information integrating circuit 104A, which is the hardware circuit, is described by the pseudo code.

That is, the input data is exemplified as array data of 8 (rows)×40 (bits). Further, the input data of 40 bits in each row is the most significant bit position (the output of the statistical information acquiring circuit 102A of FIG. 16) or the least significant bit position. In the processing, the total bits are first cleared for the output data out of 40 bits. Next, the values of the elements of each column i of the array (in[j][i]) of the input data are added to all rows (j=0 to 7). Accordingly, unlike FIG. 15, in the pseudo code of FIG. 17, output data (array element) out[j] is an integer of log 2 (the number of pieces of the SIMD data) bits (3 bits in the example of FIG. 17). Further, in FIG. 17, it is assumed that the number of pieces of the SIMD data (the number of pieces of the data processed in parallel) is eight, but the number of pieces of the SIMD data is not limited to eight.

Figure 18:
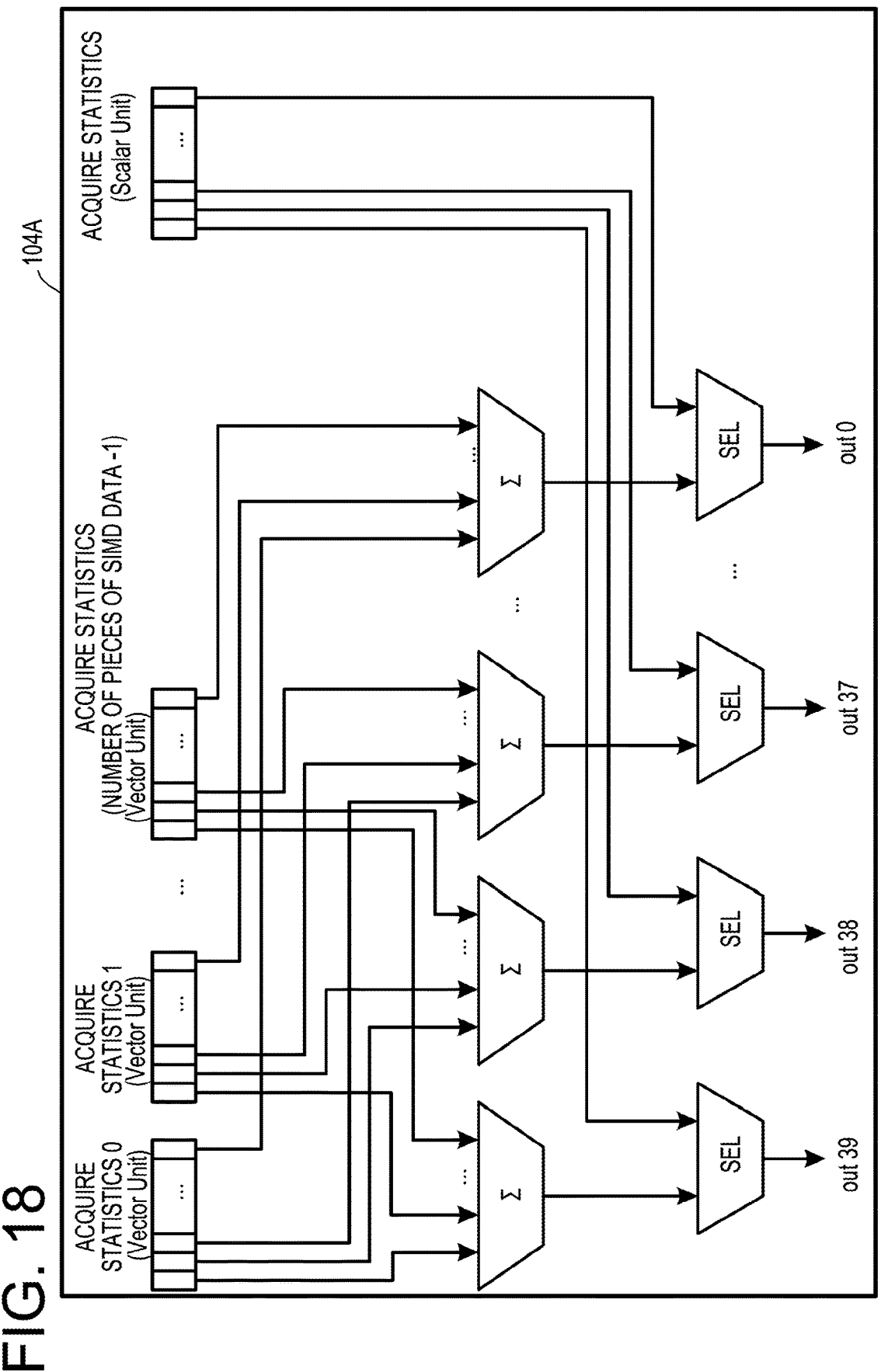
FIG. 18 is a diagram illustrating a configuration of a hardware circuit of the statistical information integrating circuit.

FIG. 18 illustrates a configuration of a hardware circuit of the statistical information integrating circuit 104A that acquires the bit distribution from the data acquired by the statistical information acquiring circuit 102. The data (in this case, statistics acquisition 0 to statistics acquisition (the number of pieces of the SIMD data—1)) acquired by the statistical information acquiring circuit 102 is processed by a bit population count operation, so that the number of 1 in the $i^{th}$ bit (i=0 to 39) of the eight pieces of statistical information is counted. The input data is the most significant bit position acquired by the statistical information acquiring circuit 102A (see, e.g., FIG. 15). Accordingly, the statistical information integrating circuit 104A counts the number of times of the occurrence of the most significant bit position by counting the number of times of the occurrence of "1" of each bit for the most significant bit positions for the amount of the number of pieces of the SIMD data acquired by the statistical information acquiring circuit 102A. The statistical information integrating circuit 104A stores the counting result in the output data out0 to out39.

Figure 19:
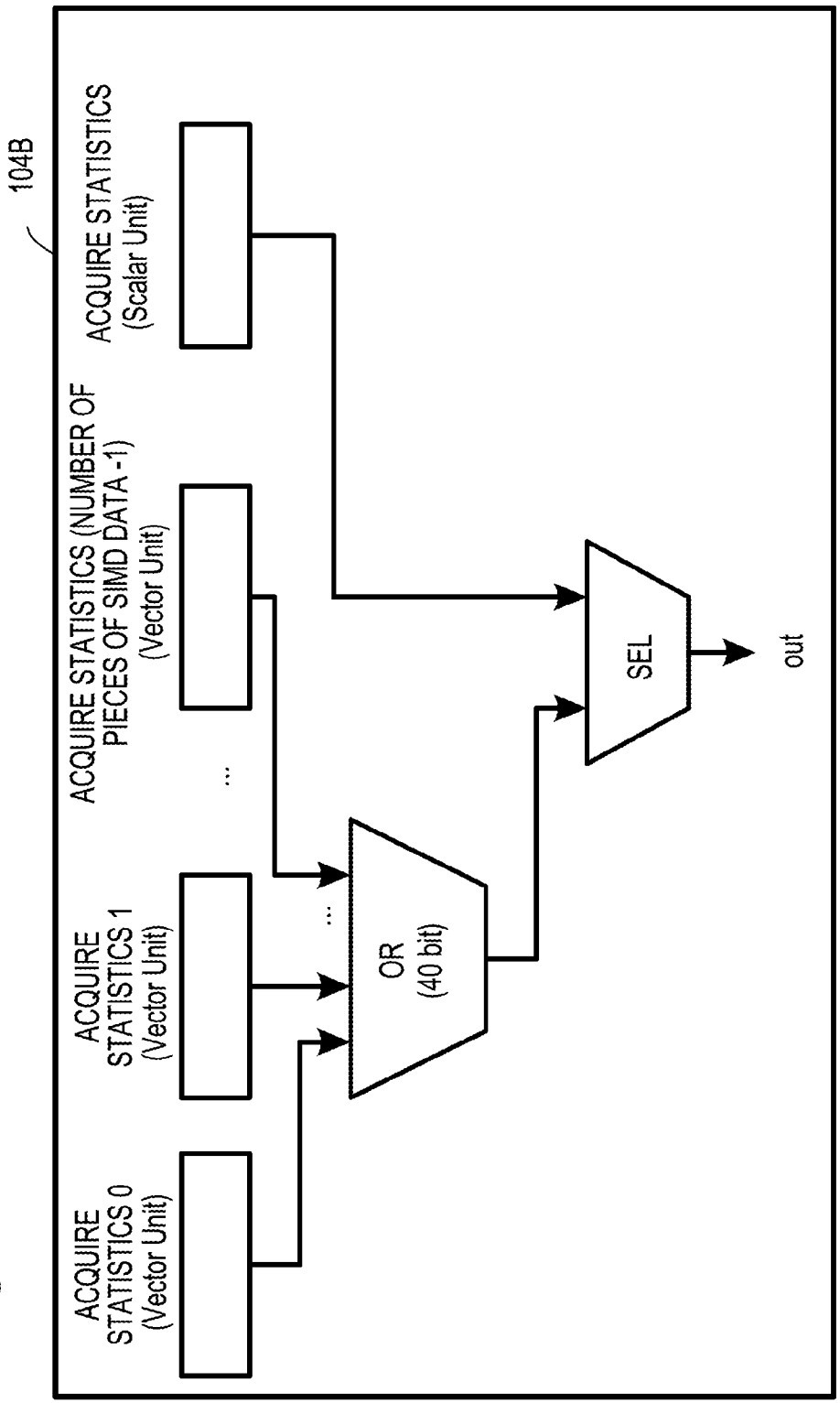
FIG. 19 is a diagram illustrating the configuration of the hardware circuit of the statistical information integrating circuit.

FIG. 19 illustrates a configuration of a hardware circuit of the statistical information integrating circuit 104B, which integrates a bit position by an OR operation based on a premise in which a maximum value and a minimum value of a bit position are acquired from the data acquired by the statistical information acquiring circuit 102. The data acquired by the statistical information acquiring circuit 102 (in this case, statistics acquisition from statistics acquisition 0 (the number of pieces of the SIMD data—1) is OR operated by an OR gate (40 bits). Further, in FIG. 18, a selector SEL selects the OR operation and the data acquired from the scalar unit 14. The data selected by the selector SEL is output to the output data (out). Accordingly, the data acquired by the statistical information acquiring circuit 102 from the scalar unit 14 is not OR operated, but is output to the output data (out) as it is in one operation. The output data (out) is the data to be handed over to the statistical information storing circuit 105.

The statistical information integrating circuit 104B, which integrates a bit position by the OR operation, is an example of a circuit that accumulates a bit string indicating a position of the most significant bit, which does not match the sign bit, with a true value by the OR operation by the plurality of pieces of the fixed point data. The statistical information integrating circuit 104B, which integrates a bit position by the OR operation, is also an example of a circuit that accumulates a bit string indicating a position of the least significant bit, which does not match the sign bit, with a true value by the OR operation by the plurality of pieces of the fixed point data.

Figure 20:
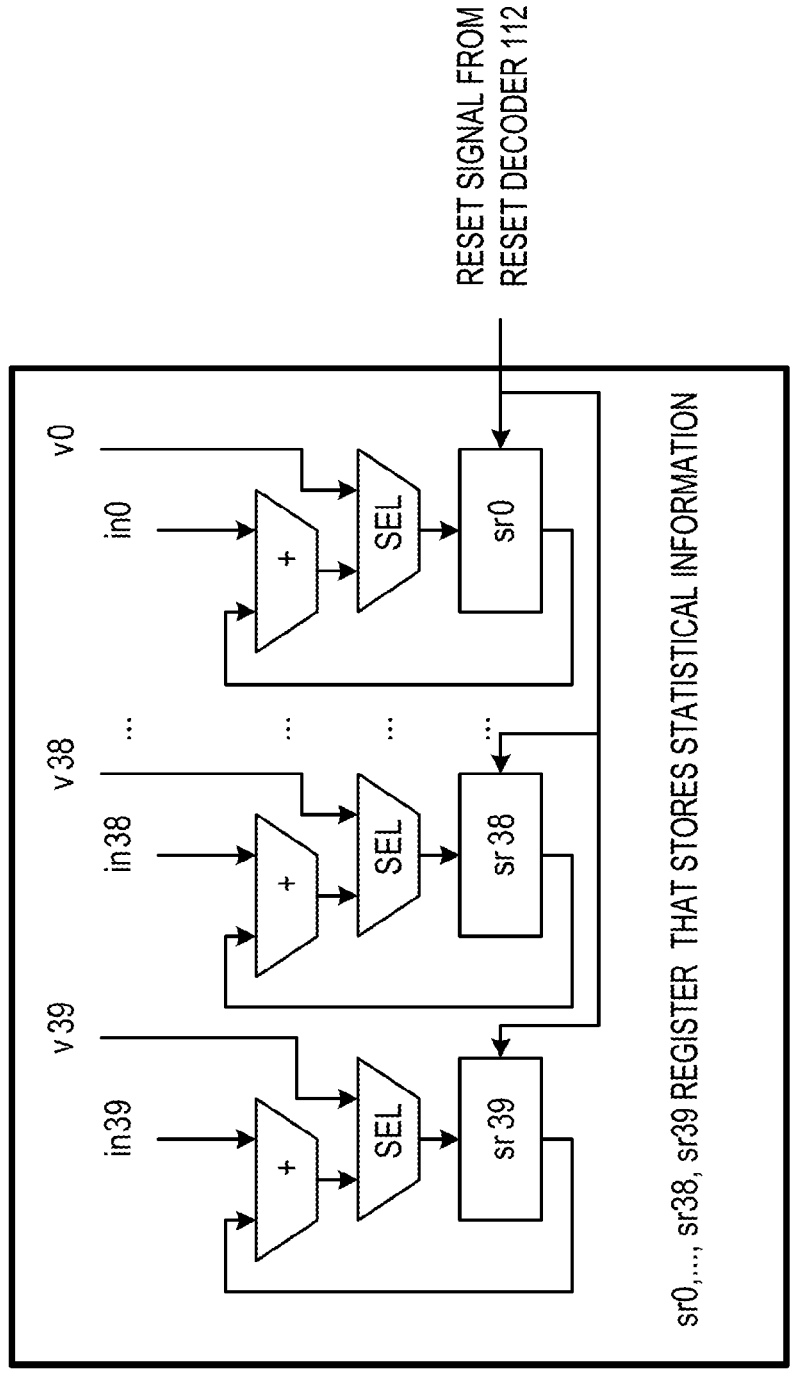
FIG. 20 is a diagram illustrating a configuration of a hardware circuit of a statistical information storing circuit.

FIG. 20 illustrates a configuration of a statistical information storing circuit 105A, which stores the statistical information from the statistical information integrating circuit 104A in an dedicated register, as a particular example of the statistical information storing circuit 105 (see, e.g., FIG. 12). In the drawing, in39 to in0 represent statistical information from the statistical information integrating circuit 104 corresponding to out39 to out0 of FIG. 18. Further, sr39 to sr0 are register values that store the statistical information. The processor 10 records initial values v39 to v0 from any one or more of the register sr39 to sr0 through the selector SEL by the recording instruction. However, the processor 10 may reset the register sr39 to sr0 by a reset signal from a decoder. The processor 10 accumulates the statistical information by using the adding circuit and stores the accumulated statistical information in the registers sr39 to sr0 whenever the instruction with the statistical information acquiring function is executed. A combination of the statistical information integrating circuit 104A (see, e.g., FIGS. 17 and 18) and the statistical information storing circuit 105A (see, e.g., FIG. 20) that stores the statistical information from the statistical information integrating circuit 104A in the dedicated register is an example of a circuit that accumulates the position of the most significant bit, which does not match the sign bit, to the plurality of pieces of the fixed point data and counts the position of the most significant bit. The combination of the statistical information integrating circuit 104A (see, e.g., FIGS. 17 and 18) and the statistical information storing circuit 105A (see, e.g., FIG. 20) that stores the statistical information from the statistical information integrating circuit 104A in the dedicated register is also an example of a circuit that accumulates the position of the least significant bit, which does not match the sign bit, to the plurality of pieces of the fixed point data and counts the position of the least significant bit. Further, the processor 10 reads any one or a plurality of values from the registers (sr39 to sr0) and saves the read value in the memory for data specified by the reading instruction or a general purpose register specified by the reading instruction.

Figure 21:
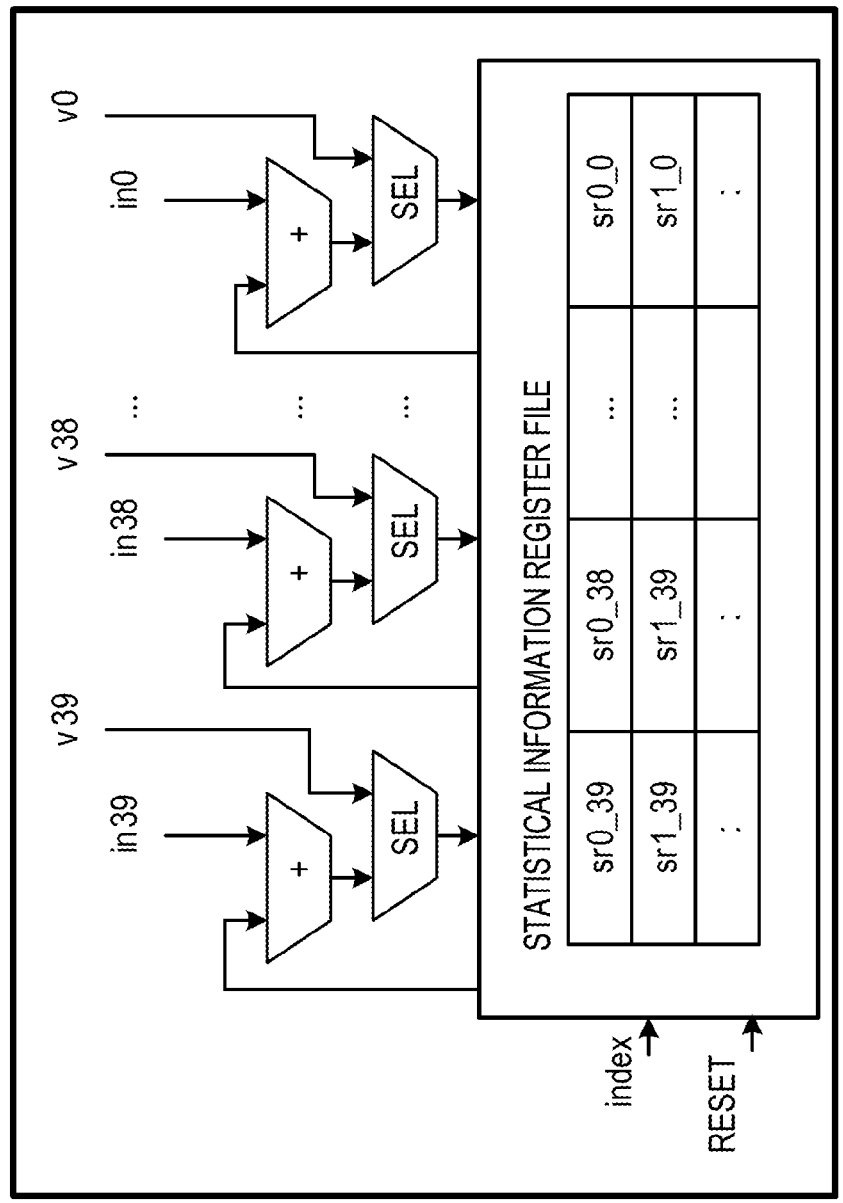
FIG. 21 is a diagram illustrating a modified example of the statistical information integrating circuit.

FIG. 21 is a modified example of the statistical information integrating circuit 104, and an example of a configuration of a circuit in which a storage place of the statistical information is designated by an index from the decoder 112. In the drawing, for example, an area of sr[j][i] (j=0, . . . , and k, and i=0, . . . , and 39) is secured, so that a row j of the register file is designated by an index.

The processor 10 records an initial value in one or the plurality of registers of the row j of the register file designated by the index through the selector SEL by the recording instruction. However, the processor 10 may reset the row j of the register file designated by the index by a control signal from the decoder 112. Further, the processor 10 accumulates statistical information from in39 to in0 in the adding circuit, and stores the accumulated statistical information in the row j of the register file designated by the index. Further, the processor 10 reads the statistical information from the row j of the register file designated by the index by the control signal from the decoder 112. Further, the processor 10 reads any one or the plurality of values in the row j of the register file designated by the index and saves the read value in the memory for data designated by the reading instruction or stores the read value in the general purpose register designated by the reading instruction.

Figure 22:
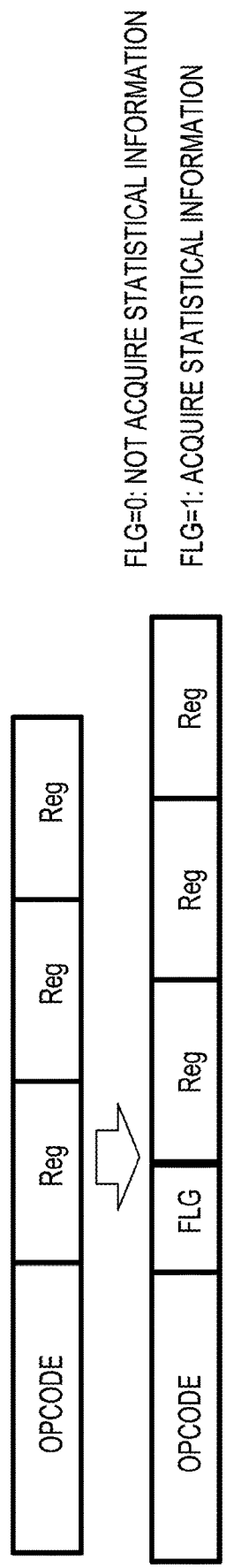
FIG. 22 is a diagram illustrating an instruction format.

FIG. 22 illustrates an instruction format of an instruction instructing acquisition of statistical information in the first embodiment. As illustrated in FIG. 22, a bit that specifies whether statistical information is acquired may be added by extending an existing instruction format. According to the example of FIG. 22, for example, a statistical information acquiring function may also be added for the entire instructions. As illustrated in the drawing, FLG=1 specifies acquisition of statistical information. In the meantime, FLG=0 does not specify acquisition of statistical information, and represents the same instruction as that of the related art.

Figure 23:
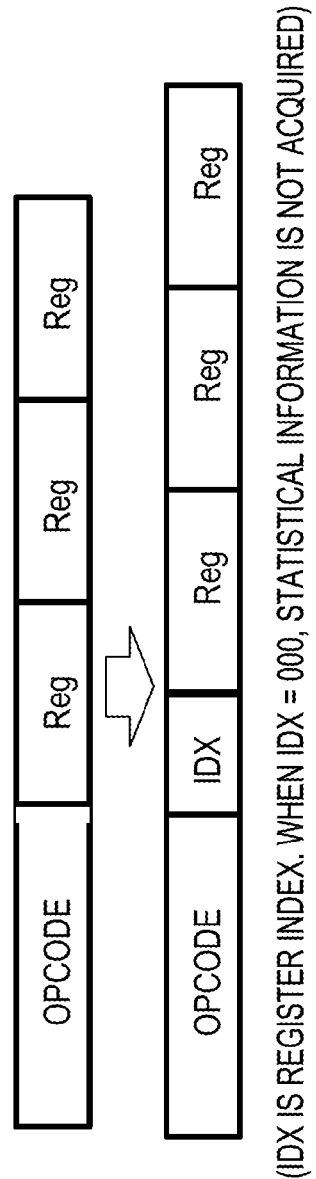
FIG. 23 is a diagram illustrating an instruction format.

FIG. 23 illustrates a modification of the instruction format. As illustrated in FIG. 23, a register index that stores statistical information may be specified by extending an instruction format. In the drawing, IDX represents a register index (the index of FIG. 21 and the like). However, when IDX=000, the processor 10 does not acquire statistical information. The decoder 112 of FIG. 12, which decodes the instruction format of FIG. 23 and acquires the register index IDX, is an example of a decoder that acquires the designation of a storage place of statistical information.

Figure 24:
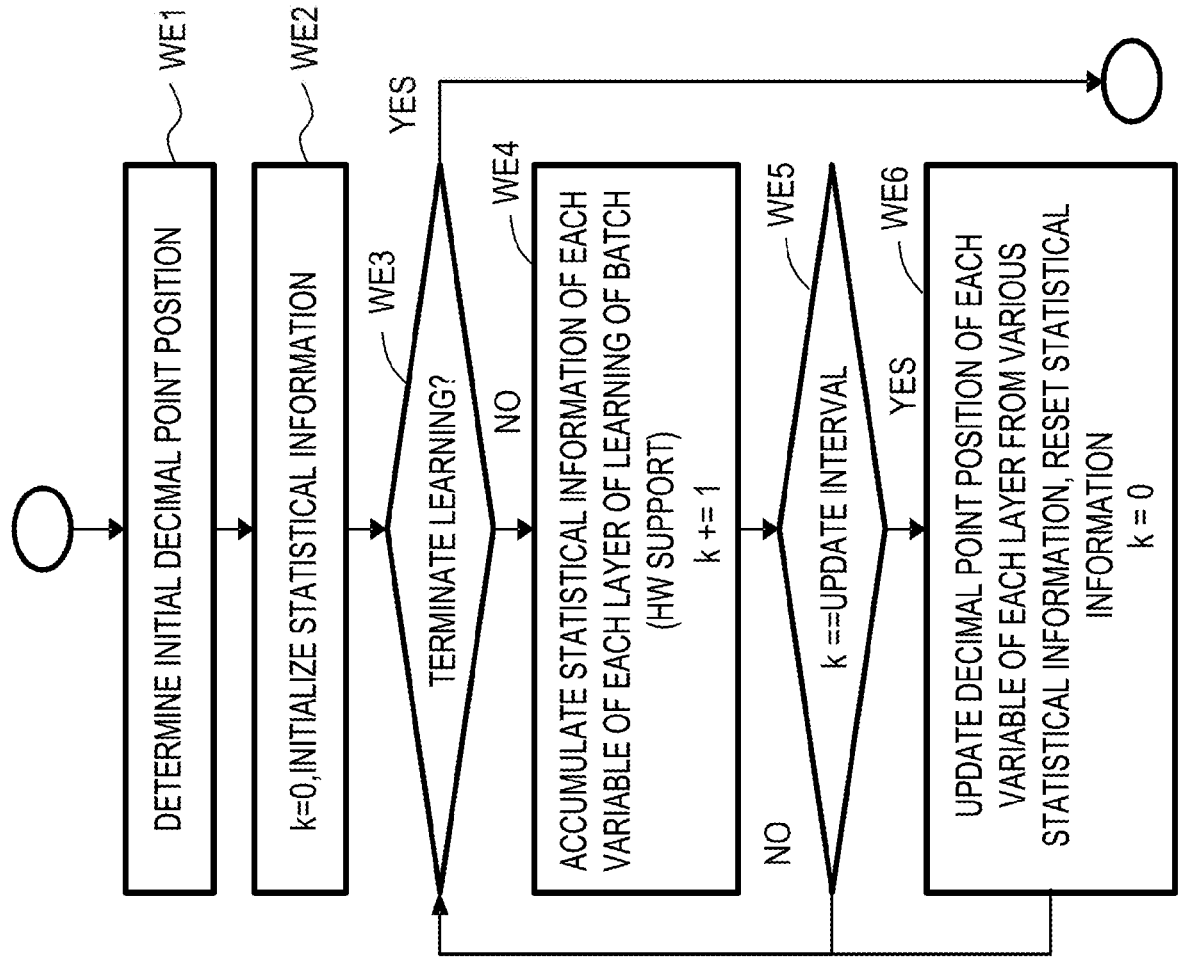
FIG. 24 is a flowchart illustrating learning processing by an information processing apparatus.

FIG. 24 is a flowchart illustrating learning processing by the information processing apparatus 1 of the first embodiment. In the processing, the information processing apparatus 1 determines an initial decimal point position (WE1). The information processing apparatus 1 may determine an initial decimal point position of each variable by a past experimental value, a performance value, or a designation by a user.

The information processing apparatus 1 initializes the number k of times to 0. Further, the information processing apparatus 1 initializes a variable that stores statistical information within a program (WE2). Further, the information processing apparatus 1 determines whether a condition of a termination of the learning is satisfied (WE3). The termination of the learning corresponds to the case where an error in the fully connected layer fc2 is equal to or smaller than a reference value or the number of times of the learning reaches a specified maximum value.

When the condition of the termination of the learning is not satisfied, the information processing apparatus 1 executes a next mini batch. In this case, the information processing apparatus 1 accumulates the statistical information of each variable of each layer in the statistical information register or the statistical information register file. The accumulation of the statistical information is executed by the hardware of the processor 10 as described above. Further, the information processing apparatus 1 counts up the variable k (WE4).

The information processing apparatus 1 determines whether the number k of times reaches an update interval (WE5). When it is determined that the number k of times does not reach the update interval, the information processing apparatus 1 returns to processing WE3. In the meantime, when it is determined that the number k of times reaches the update interval, the information processing apparatus 1 reads the statistical information in which the various statistical information is accumulated, from the statistical information register, the statistical information register file, or the retreat area of the memory. Further, the information processing apparatus 1 updates the decimal point position of each variable of each layer based on the read statistical information (WE6).

In this case, the information processing apparatus 1 may determine the decimal point position so that, for example, a ratio of the saturated data and the number of pieces of the entire underflow data satisfies a target condition. Further, when both the ratio of the entire saturated data and the radio of the entire underflow data are difficult to satisfy the target condition, the information processing apparatus 1 may prioritize one ratio. Further, the information processing apparatus 1 may also set the decimal point position by assigning a position to a center of a range in which an average of an upper limit bit position where the saturation does not occur, and a lower limit bit position where valid data exists, is expressible by a fixed point number. Further, the information processing apparatus 1 initializes the number k of times to 0 and further resets the register that stores the statistical information. Then, the information processing apparatus 1 returns to processing C3.

The accumulation of the statistical information of each variable of each layer in WE4 and the reading of the statistical information from the register or the register file in which various statistical information is accumulated in WE6 are the examples of the acquisition of the statistical information for the bit distribution in the fixed point data at the time of the execution of the instruction including the instruction of the operation in at least one layer among one or more layers. Further, the updating of the decimal point position of each variable of each layer based on the read statistical information in WE6 is an example of updating the decimal point position of the fixed point data based on the statistical information for the bit distribution.

Second Embodiment

With reference to FIGS. 25 to 35, descriptions will be made on an information processing apparatus 1A according to a second embodiment. In the first embodiment, as illustrated in FIG. 13, the selector 101 selects any one of the output result of the vector operational circuit 131-2 and the reading result (Read Data 0, . . . , and Read Data 0) from the memory 22 for data, and inputs the selected result to the statistical information acquiring circuit 102 and the data converting circuit 103. Further, the statistical information acquired by the statistical information acquiring circuit 102 is input to the statistical information integrating circuit 104. In the meantime, the data converted by the data converting circuit 103 that adjusts the decimal point position is stored in the memory 22 (Write Data 0, . . . , and Write Data n) for data or is maintained in the vector register (Vector Reg2) through a selector (not illustrated). The statistical information acquiring circuit 102 is prepared with a separate path from those of various operational circuits in which an operation command of the processor 10 is executed. The data converting circuit 103 shifts an input bit pattern by the number of bits specified by an instruction by the instruction from the decoder 112. The data converting circuit 103 is an example of an updating circuit.

More particularly, in FIG. 13, the statistical information is acquired by, for example, the data converting circuit 103, which is a path of the data output by the vector operational circuit 131, and the statistical information acquiring circuit 102 and the statistical information integrating circuit 104, which are prepared with the separate paths from that of the memory interface. Further, the statistical information acquiring circuit 102 and the statistical information integrating circuit 104 are prepared with separate paths from that of a circuit for another operation instruction, for example, the a multiply-accumulate operation accumulator 132 or other adding circuits (not illustrated). That is, in the first embodiment, the statistical information acquiring circuit 102 and the statistical information integrating circuit 104 are implemented in a circuit branched from a data path of the output of the operational circuit in which the operation is executed, according to an instruction decoded by the decoder 112 of the processor 10. Accordingly, the processor 10 of the embodiment may acquire, for example, the statistical information illustrated in FIG. 11 together with the result of the vector operation at the time of the one execution of the vector operation.

Figure 25:
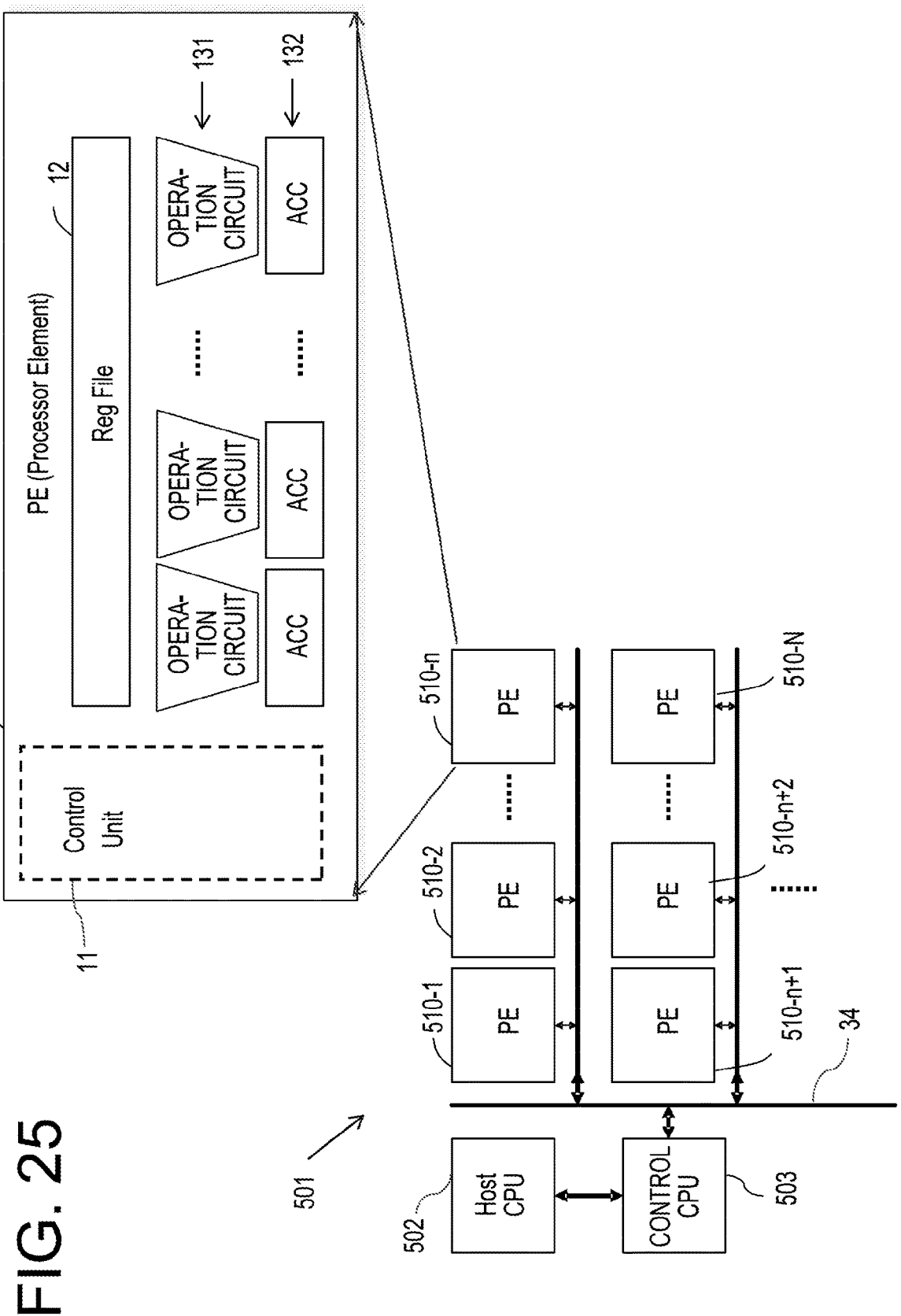
FIG. 25 is a diagram describing a further problem in an operation processing apparatus of a first embodiment.

FIG. 25 is a diagram describing a further problem in the first embodiment. When the configuration of the processor 10 described in the first embodiment is expanded and applied to a multi-core so as to acquire statistical information from each core, a circuit is provided in each core to acquire and further integrate the statistical information, and as a result, the circuit scale of the processor 10 is increased. FIG. 25 is a diagram illustrating a configuration of an information processing apparatus 501 of the multi-core configuration. The information processing apparatus 501 includes a host CPU 502, a control CPU 503, and a plurality of processing circuits (also referred to as processor element, PEs) 510-1 to 510-N. Hereinafter, when the processing circuits are collectively named without discriminating the processing circuits 501-1, the processing circuits are called the processing circuit 510. The control CPU 503 and each processing circuit 510 are connected through a bus 34. The processing circuit 510 has the same configuration as that of the processor 10 of the first embodiment, and includes, for example, a control unit 11, a register file 12, a vector operational circuit 131, and a multiply-accumulate operation accumulator 132. Further, the control unit 11 may not include the processing circuit 510. When the control unit 11 is not included, the decoder 112 of the first embodiment may be installed in, for example, the control CPU 503, and the control CPU 503 may issue a control signal to each processing circuit 510 according to a decoded instruction.

Figure 26:
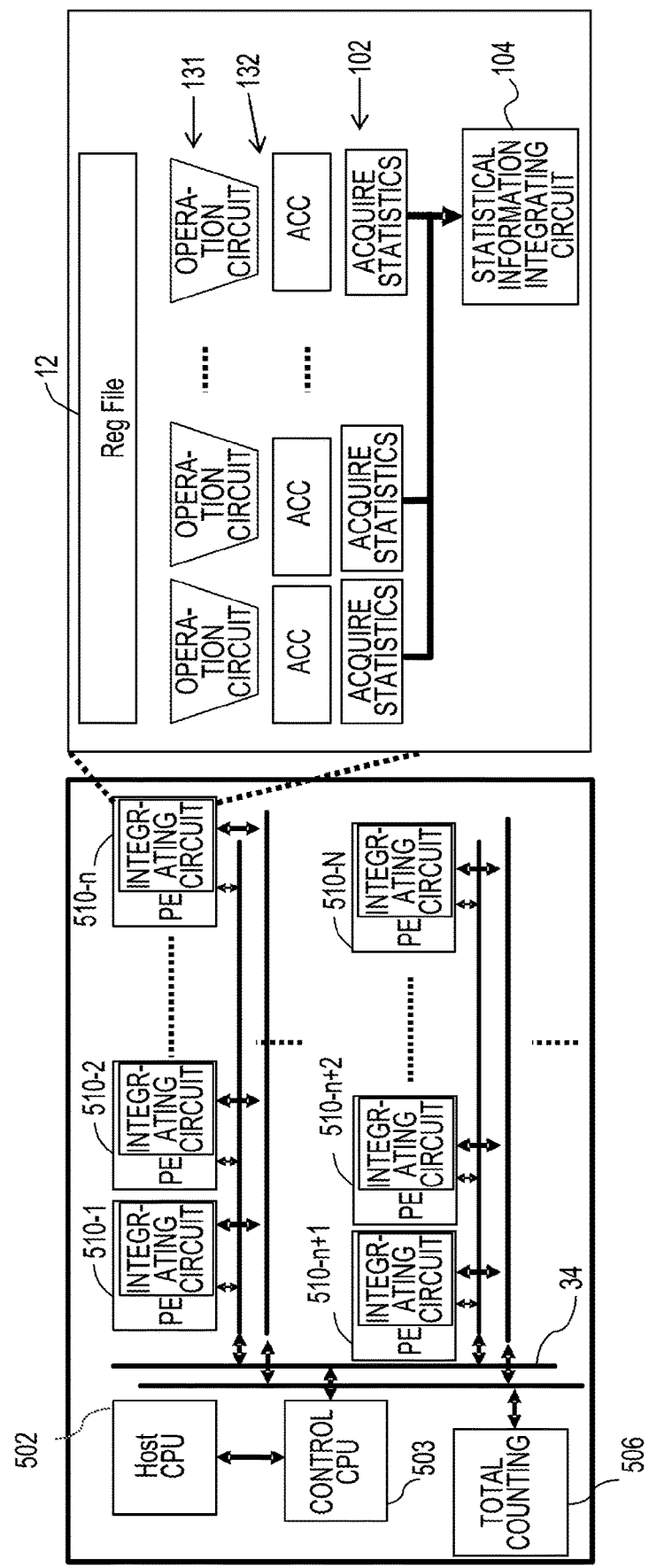
FIG. 26 is a diagram illustrating a configuration example in the case where a configuration of a processor of the first embodiment is simply applied to an information processing apparatus.

FIG. 26 is a diagram illustrating a configuration example in the case where the configuration of the processor 10 of the first embodiment is simply applied to the processing circuit 510 of the information processing apparatus 501. In FIG. 26, a statistical information acquiring circuit 102 and a statistical information integrating circuit (also referred to as a counting circuit) 104 similar to the first embodiment are added to each processing circuit 510. In FIG. 26, the statistical information integrating circuit 104 within the processing circuit 510 is described as the "integrating circuit". The configurations and the operations of the statistical information acquiring circuit 102 and the statistical information integrating circuit 104 are the same as those of the first embodiment, so that the descriptions thereof will be omitted. In FIG. 26, a total counting circuit 506, which counts the statistical information counted by the statistical information integrating circuit 104 of each processing circuit 510 as a total is further added. As described above, when the configuration of the processor 10 of the first embodiment is applied to the information processing apparatus 501 having the plurality of processing circuits 510 as the simple multi-core configuration, the circuits that acquire, integrate, and totally count the statistical information and the dedicated buses connecting the circuits are increased, so that the circuit scale is increased.

Because of this, in the second embodiment, a processing circuit 10A, to which a dedicated instruction that acquires statistical information is added, is adopted instead of the processing circuit 510 of FIG. 26. The dedicated instruction executes processing by using, for example, an existing register, bus, and operational circuit in order to execute an existing instruction before the addition of the dedicated instruction. The circuits that integrate and totally count the statistical information and the circuit that includes the dedicated buses connecting the circuits illustrated in FIG. 26 are decreased by using the existing register, bus, and operational circuit. Accordingly, compared to the case where the statistical information integrating circuit 104 and the total counting circuit 506, which are the dedicated hardware, are used as in the first embodiment, there is a possibility that overhead may be generated. However, in the machine adopting the deep learning as a processing target, the multiply-accumulate operation becomes a main agent in executed processing, so that it is expected that the overhead generated by acquiring and integrating the statistical information by using the existing register, bus, and operational circuit is very little or ignorable compared to the entire processing of the deep learning.

Figure 27:
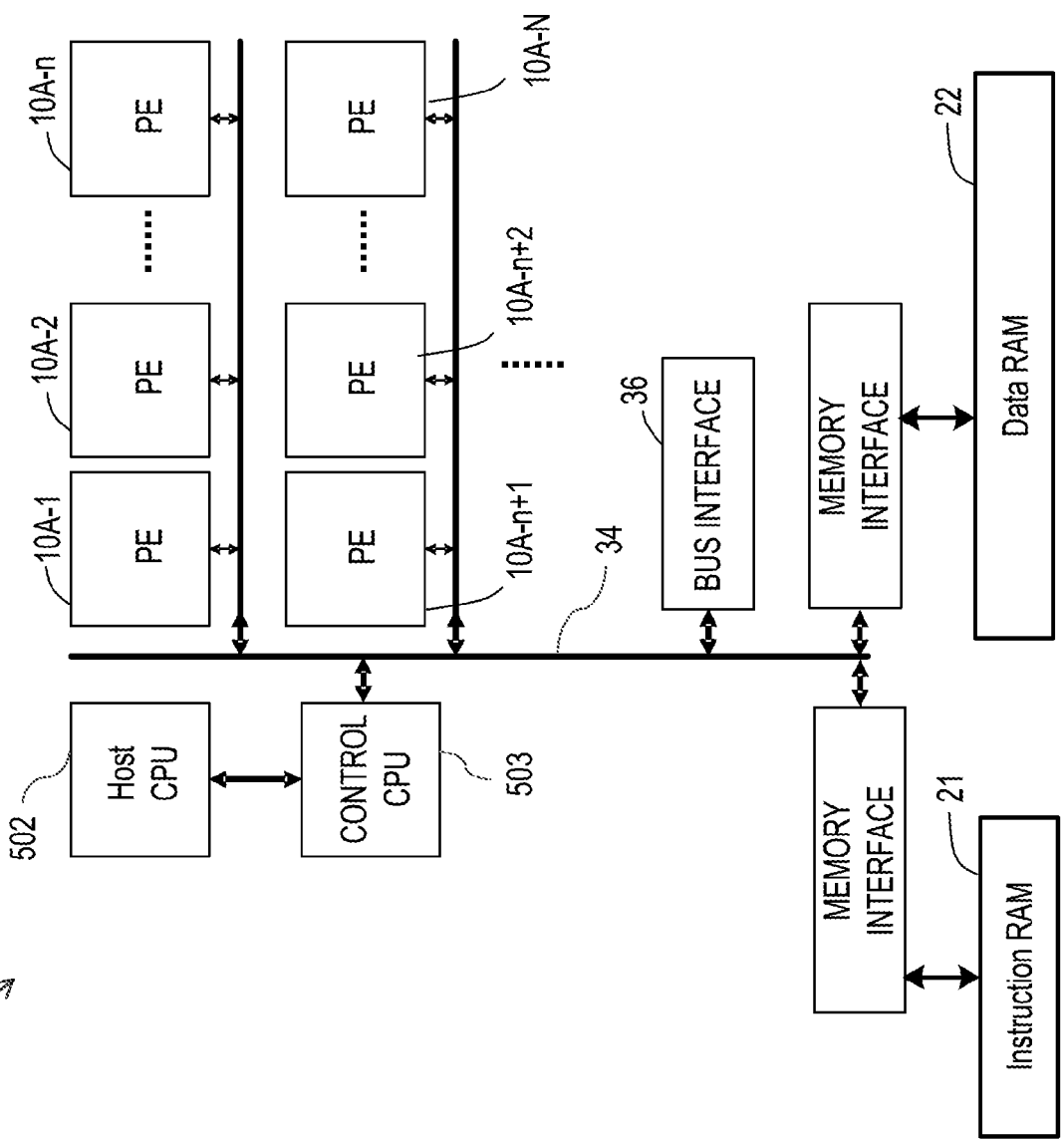
FIG. 27 is a diagram illustrating a configuration of an information processing apparatus of a second embodiment.

FIG. 27 illustrates a configuration of the information processing apparatus 1A of the second embodiment. The information processing apparatus 1A includes the host CPU 502, the control CPU 503, and a plurality of processing circuits 10A-1 to 10A-N. In the drawing, the processing circuit 10A is described as the "PE". The control CPU 503 and each processing circuit 10A are connected through the bus 34. Further, FIG. 27 illustrates a memory 21 for an instruction and a memory 22 for data connected with the bus 34 through a bus interface 36 and a memory interface.

Figure 28:
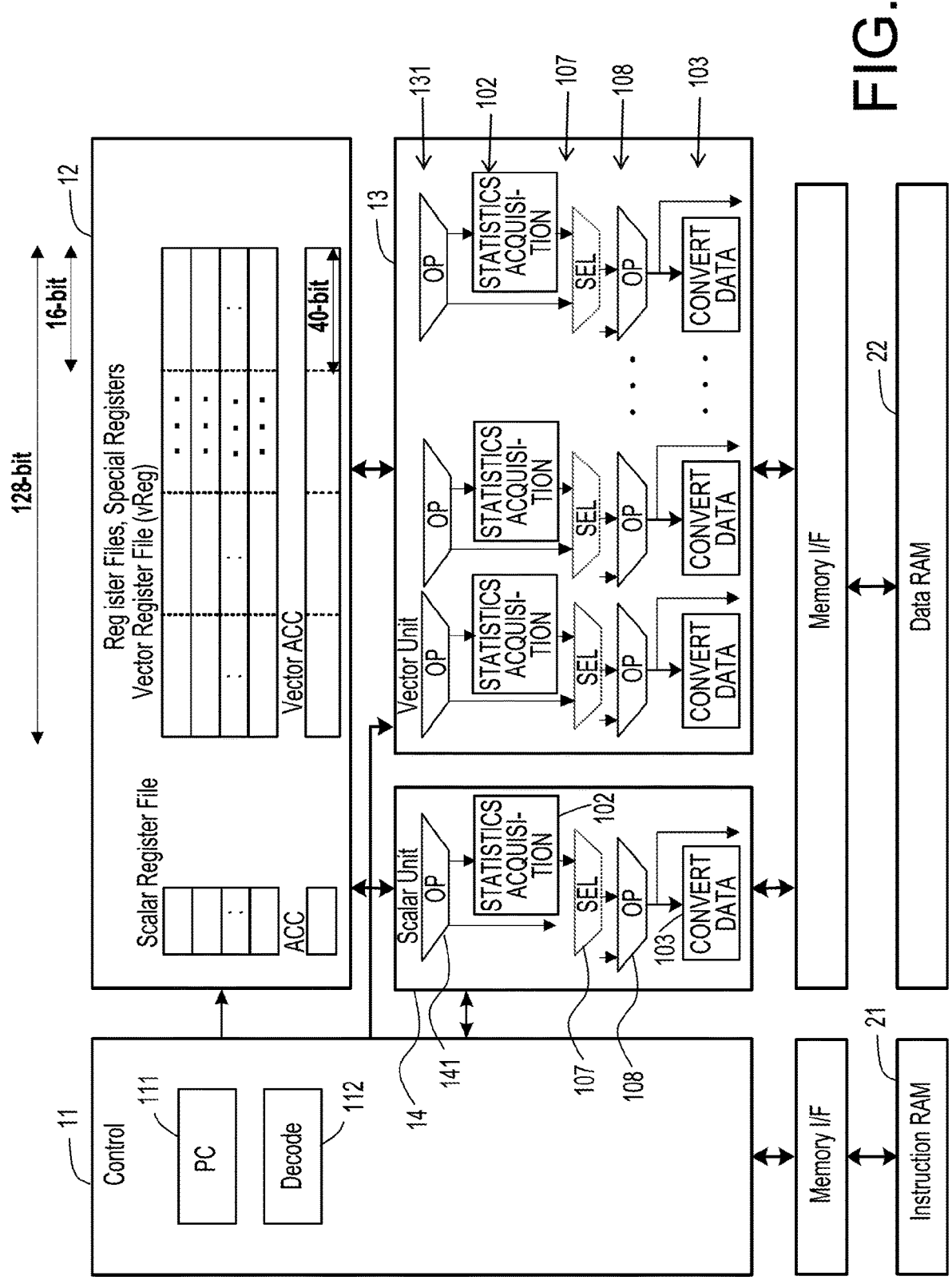
FIG. 28 is a diagram illustrating a circuit block of a processing circuit within the information processing apparatus.

FIG. 28 illustrates a circuit block of a processing circuit 10A within the information processing apparatus 1A. FIG. 28 illustrates the memory interface, the memory 21 for the instruction, and the memory 22 for data together with the processing circuit 10A. The processing circuit 10A includes a control unit 11, a register file 12, a vector unit 13, and a scalar unit 14. The control unit 11 includes a program counter 111 and a decoder 112. The register file 12 includes a vector register file, an accumulator register for a vector operation (vector ACC), a scalar register file, and an accumulator register for a scalar operation (ACC). Then, for the description, it is assumed that the vector register file vReg is 16-bit×8-way=128-bit, and the accumulator register for the vector operation (vector ACC) is 40-bit×8-way=320-bit. Further, in the present embodiment, the processing circuit 10A is adopted as the plurality of processing circuits 10A of FIG. 27. Accordingly, the processing circuit 10A of FIG. 28 is an example of the plurality of operation processing apparatuses. Further, the vector operational circuit 131 and the scalar operational circuit 141 are the same as those of the first embodiment, so that the descriptions thereof will be omitted. The vector operational circuit 131 is an example of the plurality of operational circuits.

The vector unit 13 includes the vector operational circuit 131 as in the first embodiment. Further, the scalar unit 14 includes the scalar operational circuit 141 as in the first embodiment. The vector operational circuit 131 is an example of the plurality of operational circuits.

However, in the first embodiment, the processor 10 includes the dedicated statistical information integrating circuit 104 and statistical information storing circuit 105 and acquires the statistical information through the hardware with the operation of the existing operational circuit in parallel. In the second embodiment, as illustrated in FIG. 28, the statistics acquisition processing is executed by an instruction of the processing circuit 10A (also referred to as a statistical information acquisition instruction). The hardware circuit that executes the statistics acquisition processing according to the statistical information acquisition instruction is combined to a data path of the operational circuit executed by the existing instruction. As a result, the statistical information acquisition instruction shares the resources, such as the operational circuit, the register, and the bus within the processing circuit 10A, with another existing instruction.

As illustrated in FIG. 28, the processing circuit 10A of the second embodiment includes a selector 107. Further, an output from the vector operational circuit 131 passes through a path directly input to the selector 107 and a path input to the statistical information acquiring circuit 102. The selector 107 within the vector unit 13 selects a signal output from the vector operational circuit 131 and a signal output from the statistical information acquiring circuit 102, and inputs the selected signal to the operational circuit 108 of the existing instruction. Similarly, the output from the scalar operational circuit 141 passes through a path directly input to the selector 107 within the scalar unit 14 and a path input to the statistical information acquiring circuit 102. The selector 107 of the scalar unit 14 selects a signal output from the scalar operational circuit 141 for the scalar operation and a signal output from the statistical information acquiring circuit 102, and inputs the selected signal to the operational circuit 108 of the existing instruction. The operational circuit 108 of the existing instruction is an adding circuit executed by an adding instruction. The data converting circuit 103 adjusts a fixed point position of the operation result of the operational circuit 108 by the existing adding instruction, and saves the operation result in the memory 22 for data through the memory interface.

Figure 29:
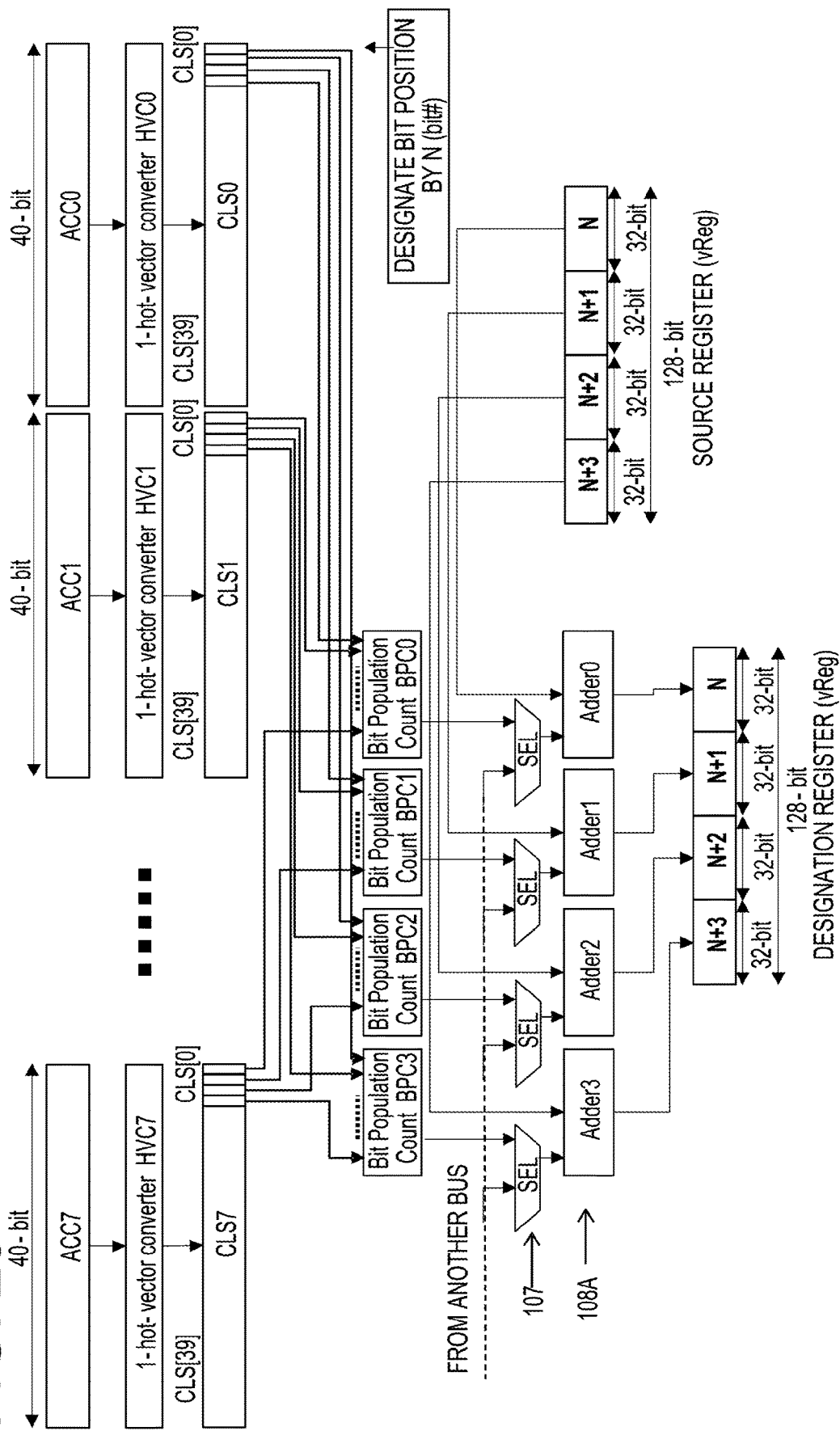
FIG. 29 is a diagram illustrating an operational circuit, which executes an acquisition processing of statistical information by a statistical information acquisition instruction, in detail.

FIG. 29 is a diagram illustrating the operational circuit, which executes the acquisition processing of the statistical information by the statistical information acquisition instruction, in detail. The circuit of FIG. 29 is an example of the acquiring circuit. FIG. 29 is a detailed configuration example of the circuit that executes the acquisition processing of the statistical information within the operational circuit including the accumulator register for the vector operation of FIG. 28 (vector ACC) and the vector unit 13. As described above, the processing circuit 10A includes the accumulator registers ACC0 to ACC7 for the vector operation of 40 bits (8 ways in union). The outputs of the accumulator registers ACC0 to ACC7 for the vector operation are output to 1-hot-vector converters HVC0 to HVC7, respectively. The 1-hot-vector converter converts the data into a bit string in which the most significant bit is 1 and other bits are 0 in the input numerical values (e.g., 40 bits) and outputs the bit string. The configuration of the 1-hot-vector converter is similar to, for example, which illustrated in FIG. 16 of the first embodiment. Further, as illustrated in FIG. 16, for the input of all 0 bits or all 1 bits, the 1-hot-vector converters HVC0 to HVC7 convert the sign bit to 1 and other bits to 0 and output the bits. The 1-hot-vector converters HVC0 to HVC7 are the example of a circuit that sets a flag bit at a position of the most significant bit, which does not match the sign bit in the fixed point data after the execution of the operation.

The conversion results by the 1-hot-vector converters HVC0 to HVC7 are output as CLS0 to CLS7. CLS0 to CLS7 are signals of count leading signs of the operation results of the accumulator registers ACC0 to ACC7 for the vector operation, respectively. However, a register that stores the signals of CLS0 to CLS7 may be installed within the circuit of FIG. 29. 1 bit set by the conversion results by the 1-hot-vector converters HVC0 to HVC7 is an example of the flag bit.

Four bit population count circuits BPC0 to BPC3 are installed at output designations of CLS0 to CLS7 in parallel. Each of the bit population count circuits BPC0 to BPC3 is a circuit that adds a designated bit in a bit string of the signals of CLS0 to CLS7. That is, the designated bit among CLS0 to CLS7 is input to each of the bit population count circuits BPC0 to BPC3. The designated bit is designated by a signal of a bit position designation N (not illustrated). For example, when the bit position designation N=0, bit 0 of the bit string of eight columns of CLS0[0] to CLS7[0] is input to the bit population count circuit BPC0. Further, when the bit position designation N=0, bit 3 (CLS0[3] to CLS7[3]) of the bit string of eight columns of CLS0 to CLS7 is input to the bit population count circuit BPC3.

That is, in general, bit k+N (CLS0[k+N] to CLS7[k+N]) of the bit string of eight columns of CLS0 to CLS7 is input to the bit population count circuit BPCk (k=0, 1, 2, and 3). Accordingly, the bit population count circuits BPC0 to BPC3 sum the respective bits of CLS0 to CLS7 in parallel in 4 bits. The control circuit (not illustrated) of the processing circuit 10A performs the operation by the bit population count circuits BPC0 to BPC3 for the bit position designation signal N designated by a bit position designation operand of the statistical information acquisition instruction to add four consecutive bits at the same bit position of the bit string of eight columns of CLS0 to CLS7 in parallel. For example, when a bit width of CLS0 to CLS7 is 40 bits, it is possible to obtain statistical information of 40 bits by changing the bit position designation operand of the statistical information acquisition instruction to 0, 4, . . . , and 36 and repeatedly executing the statistical information acquisition instruction. The bit population count circuits BPC0 to BPC3 are the example of the circuits that add the flag bit set for the plurality of fixed point data to each bit position. The bit position designation operand may be 4 pitches of 0, 4, . . . , and 36, but may be 1 pitch of 0, 1, . . . , and 36. Further, the number of CLSs is not limited to the eight columns of CLS0 to CLS7, and a preferable number (4 columns, 16 columns, and the like) is selectable according to a design. Further, the number of bits of CLS is not limited to 40 bits, and a preferable number is selectable according to a design. Further, in FIG. 29, the four bit population count circuits are installed, and the addition is executed in parallel by 4 bits, but the number of bit population count circuits is not limited to four, and a preferable number is selectable according to a design.

Outputs from the bit population count circuits BPC0 to BPC3 are input to an adding circuit 108A through the selector 107. Four adding circuits 108A are installed in parallel. The four adding circuits 108A add the respective outputs of the bit population count circuits BPC0 to BPC3 and accumulation results accumulated in source registers, respectively, and output the result to a designation register. Herein, the source register and the designation register are elements of the vector register file vReg, and an index is designated as the operand of the statistical information acquisition instruction. When the source register and the designation register are the same element of the vector register file vReg, the adding circuit 108A forms an accumulator together with the source register and the designation register and accumulates the statistical information. The adding circuit 108A and the elements of the vector register file vReg, that is, the source register and the designation register, are the examples of the cumulative circuits. In FIG. 29, the four adding circuits 108A are installed, and the four adding circuits 108A execute the addition in parallel, but the number of adding circuits 108A is not limited to four, and a preferable number is selectable according to a design.

Each of the source register and the designation register uses 10 sets of the elements in which four elements are set to one set, from the vector register file in correspondence with each bit (10 sets in which four bits are one set) within CLS0 to CLS7, and each element has a bit width of, for example, 32 bits. However, the bit width of the element is not limited to 32 bits, and each of the source register and the destination register may be, for example, 8 bits or 16 bits. Further, as described above, CLS[0:39] illustrated in FIG. 29 is a signal line of 40 bits. However, a register that receives a signal from a signal line of 40 bits may also be installed. Further, each of the source register and the designation register is designated with one set of four elements accessed by the bit position designation signals (N=0, 4, . . . , and 36) and four elements are accessed in parallel. Further, for CLS, for example, in the case of the bit position designation signal N, four signals of CLS[N], CLS[N+1], CLS[N+2], and CLS[N+3] are accessed in parallel. Accordingly, the bit population count circuits BPC0 to BPC4 and the four adding circuits 108A sum the respective bits of CLS0 to CLS7 by executing the statistical information acquisition instruction cls_cnt 10 times and store the summed bits in four elements of each of the 10 sets of the vector register file Vreg. As a result, the distribution of the most significant bit positions in the accumulator registers ACC0 to ACC7 for the vector operation is stored in the vector register file Vreg. The four adding circuits 108A accumulate the flag bit according to a change in the bit position designation signal (N=0, 4, . . . , and 36). Accordingly, the four adding circuits 108A are the examples of the accumulating circuit that accumulates the added flag bit at the position of each bit. Accordingly, the four adding circuits 108A execute the accumulation according to the statistical information acquisition instruction cls-cnt, which will be described with reference to FIG. 33. Herein, the adding circuit 108A is an operational circuit executed by, for example, an existing multiply-accumulate operation instruction (mac) or an addition instruction. Accordingly, the accumulating circuit may accumulate the flag bit at each bit position by the adding circuit 108A used in the operation instruction.

Further, the processing circuit 10A may save the statistical information saved in the vector register file to the memory 22 for data by an existing instruction, such as a store instruction. The host CPU 502 or the control CPU 503 may pass the statistical information saved in the memory 22 for data to an application program that executes the deep learning and the like.

Further, in FIG. 29, the outputs of the bit population count circuits BPC0 to BPC3 and an output from another path are input to the selector 107. Accordingly, the decoder 112 (see, e.g., FIG. 28) controls the selection by the selector 107 according to the decode result, and may shift and execute the accumulation of the statistical information acquired by the addition by the adding circuit 108A by the existing adding instruction, the converting processing by the 1-hot-vector converters HVC0 to HVC7 by the statistical information acquisition instruction, and the processing by the bit population count circuits BPC0 to BPC4. That is, unlike the first embodiment, the processing circuit 10A of the second embodiment may acquire the statistical information by using the existing instruction of the processing circuit 10A, for example, the existing register, bus, and operational circuit used in the adding instruction and the like. That is, the accumulation of the statistical information acquired by the converting processing by the 1-hot-vector converters HVC0 to HVC7 by the statistical information acquisition instruction and the processing by the population count circuits BPC0 to BPC3 may be the acquisition of the statistical information by the acquiring circuit. Further, the circuit from the adding circuit 108A to the designation register (the element of the vector register file Vreg) may be the examples of the operational circuit that executes the existing multiply-accumulate operation instruction (referred to as a mac instruction) or the adding instruction. The element of the vector register file Vreg may be a register that outputs the result of the existing operation instruction. Accordingly, the converting processing by the 1-hot-vector converters HVC0 to HVC7, the population count circuits BPC0 to BPC3, the adding circuit 108A, and the circuit including the vector register file may be the example of the configuration in which the operational circuit corresponding to the existing instruction and the acquiring circuit executed according to the acquisition instruction include at least one common operational circuit or at least one instruction register.

As illustrated in FIG. 33, according to the acquisition instruction designated from a program such as the assembly language, the 1-hot-vector converters HVC0 to HVC7, the population count circuits BPC0 to BPC3, and the four adding circuits 108A are operated. Further, the adding circuit 108A acquires the statistical information and outputs the statistical information to the element of the general-purpose vector register file vReg designated by the acquisition instruction. Further, the adding circuit 108A and the general-purpose vector register file vReg are the examples of the operational circuit that executes the operation according to the operation instruction, such as the multiply-accumulate operation (mac) instruction and the addition (add) instruction. Further, the vector unit, the scalar unit 14, and the operational circuit 108 of the existing instruction of FIG. 28 are the examples of the operational circuit. The 1-hot-vector converters HVC0 to HVC7, the population count circuits BPC0 to BPC3, and the four adding circuits 108A are the examples of the operational circuit included in the acquiring circuit. Any one of the existing operation instruction, such as the multiply-accumulate operation instruction and addition, and the acquisition instruction is decoded by the decoder 112 and is executed by the processing circuit 10A.

Figure 30:
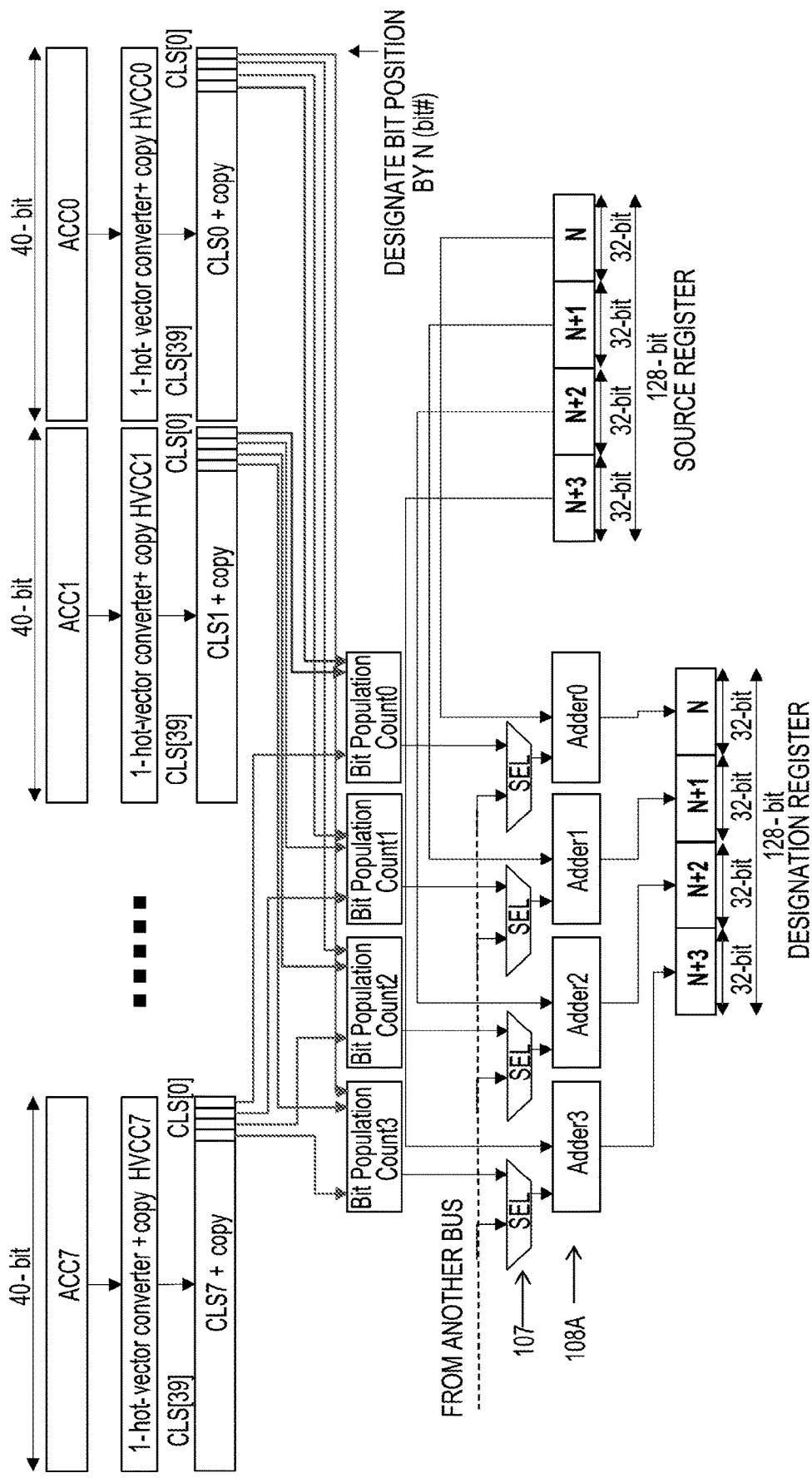
FIG. 30 is a diagram illustrating a detailed configuration example of a circuit, which acquires a bit string in which the bit from the most significant bit to bit 0 is set to bit 1.

FIG. 30 is a diagram illustrating a detailed configuration example of a circuit, which acquires a bit string in which the bits from the most significant bit to bit 0 are set to bit 1 (hereinafter, referred to as a cumulative distribution of the most significant bit), instead of the most significant bit distribution. The circuit of FIG. 30 is also an example of the acquiring circuit. FIG. 30 is different from FIG. 29 in that cumulative distribution generating circuits 1-hot-vector converter+copy HVCC0 to HVCC7 are included, instead of the 1-hot-vector converter HVC0 to HVC7 in FIG. 29.

Figure 31:
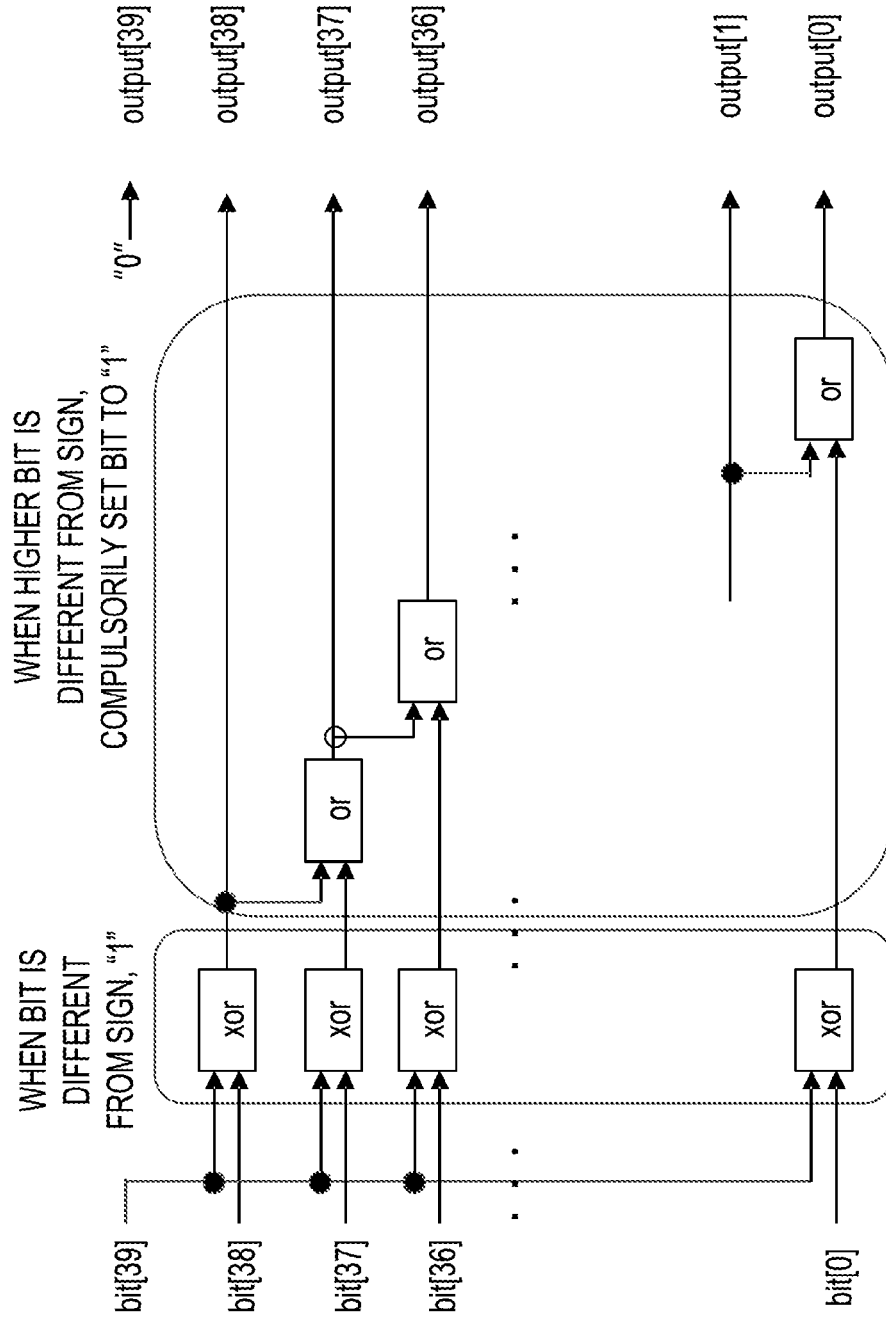
FIG. 31 is a diagram illustrating a configuration of a cumulative distribution generating circuit.

FIG. 31 illustrates a configuration of the cumulative distribution generating circuit. As illustrated in the drawing, the cumulative distribution generating circuit includes an exclusive OR (XOR) circuit of 39 digits, which executes the exclusive OR of the sign bit (bit[39]) and bit 38 (bit[38] to bit 0 (bit[0]), and an OR circuit of 38 digits, which executes an OR operation with a higher bit for the bits equal to or less than bit 37 (bit[37]). For the data in which bit 39 to bit k+1 are 0 and bit k is 1, among the output bits (output[38] to output[0]), the bits equal to or larger than bit k+1 (output[38] to output[k+1]) are set to 0 by the circuit of FIG. 31, and the bits equal to or less than bit k (output[k] to output[0]) are set to 1 by the circuit of FIG. 31. Further, in the circuit of FIG. 31, an output bit corresponding to the highest bit is fixed to 0. Accordingly, the processing of setting the flag bit "1" to the bit position corresponding to the range from the most significant bit to the lowest bit is executed by hardware. Accordingly, it is possible to collect statistical information called the cumulative distribution in which the flag bit "1" is set to the bit position corresponding to the range from the most significant bit to the lowest bit by using the configuration of FIG. 30 instead of the configuration of FIG. 29. In the configuration of FIG. 30, the processing circuit 10A may acquire statistical information by using the existing instruction of the processing circuit 10A, for example, the existing register, bus, and operational circuit used as the adding instruction, as illustrated in FIG. 29.

In FIG. 29, the circuit that outputs 1 to the least significant bit position as the 1-hot-vector converter is used, so that it is apparent that the processing circuit 10A may acquire statistical information of the least significant bit as illustrated in FIG. 29. Further, in FIG. 30, it is apparent that it is possible to acquire the statistical information by the cumulative distribution in which the flag bit "1" is set to the bit position corresponding to the range from the least significant bit to the highest bit by the cumulative distribution generating circuit.

Assembly Image

Figure 32:
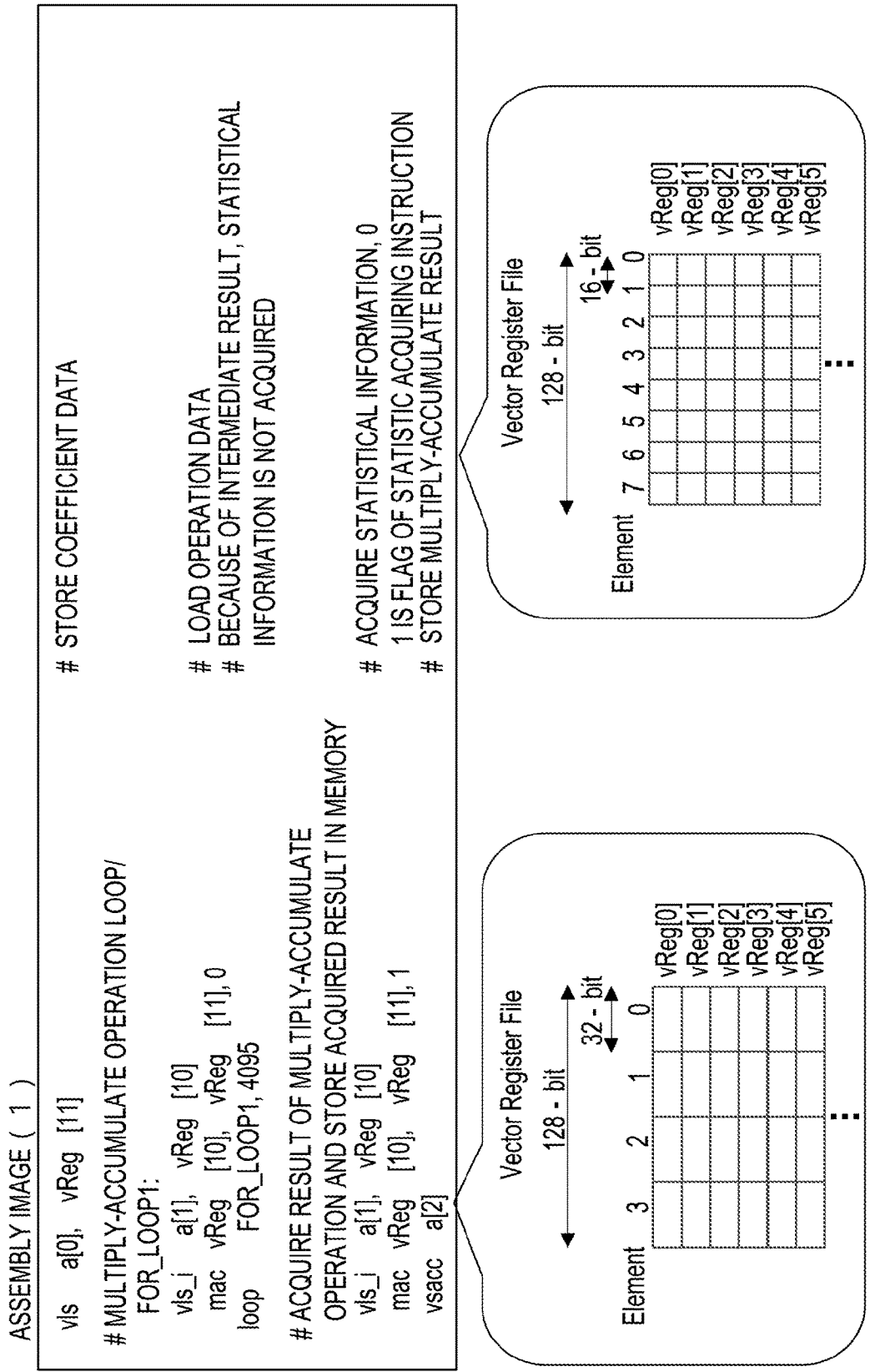
FIG. 32 is a diagram illustrating an image of a program by an assembly language that acquires statistical information by the processor described in the first embodiment.

FIG. 32 illustrates an image of a program by an assembly language that acquires statistical information by the processor 10 described in the first embodiment. Further, FIG. 32 also illustrates a configuration of the vector register vReg of the vector register file. A vector register Vreg[addr] is 128 bits in each address addr, and is accessed by 16-bit×8-way or 32-bit×4-way.

In the drawing, first, by an instruction vls that loads vector data, a coefficient vector designated by the address register a[0] is loaded to the vector register vReg[11]. Then, the vector data is loaded onto the vector register vReg[11] while incrementing the address register a[1] by a variable i. Then, the multiply-accumulate operation mac is executed between the vector registers vReg[10] to vReg[11] by changing the index i from 1 to 4095.

Herein, a parameter of an end of the mac instruction indicates that 0 indicates no acquisition of the statistical information and 1 indicates acquisition of the statistical information. Accordingly, in the example of the program of FIG. 32, the statistical information is acquired by the multiply-accumulate operation mac after 4095 times of the multiply-accumulate operation indicating no acquisition of the statistical information. In the case of the processor 10 of the first embodiment, the statistical information is acquired by the hardware independent from the path of the existing instruction, so that the statistical information may be acquired with one instruction by indicating the acquisition and the non-acquisition of the statistical information with the parameter of the end of the instruction. Further, a final instruction of FIG. 32 is a vector store instruction, and a result of the multiply-accumulate operation is stored in the address of the memory 22 for data designated by the address register a[2].

FIG. 33 illustrates an image of a program by an assembly language that acquires statistical information by the processing circuit 10A of the second embodiment. As illustrated in the drawing, an instruction vls that loads vector data and the processing by the multiply-accumulate operation mac are the same as those of FIG. 32. However, in the processing circuit 10A of the second embodiment, the acquisition and the non-acquisition of the statistical information is not specified by the parameter of the mac instruction that executes the multiply-accumulate operation. That is, in the processing circuit 10A of the second embodiment, the acquisition of the statistical information is not executed by the mac instruction in parallel. However, after the termination of the mac instruction, by the execution of the statistical information acquisition instruction cls_cnt, the statistical information of CLS[0] to CLS[39] are stored in, for example, the vector registers vReg[0] to vReg[9] of the 32-bit×4-way by four bits in parallel as described with reference to FIGS. 29 and 30.

FIG. 33 illustrates an instruction format of the instruction cls_cnt. The instruction format of the instruction cls_cnt is cls_cntcnt (bit position designation N), src (source register), and dst (designation register). Herein, in the second embodiment, the cnt (bit position designation N) specifies the bit positions within CLS0 to CLS7 described with reference to FIGS. 29 and 30 by shifting each bit by four bits. The cls_cnt may be said to be an example of the instruction, which may designate a bit portion of the acquisition target in the bit distribution in the fixed point data.

Accordingly, in the processing circuit 10A of the second embodiment, the statistical information acquisition instruction cls_cnt is executed 10 times, for example, after the termination of the multiply-accumulate operation, for CLS0 to CLS7 of 40 bits. However, the operational circuit that executes the statistical information acquisition processing of the second embodiment is not limited to the four-bit parallel circuit. The operational circuit that executes the statistical information acquisition processing may be a two-bit parallel circuit, an eight-bit parallel circuit, or a 16-bit parallel circuit.

Execution Time Chart of Statistical Information Acquisition Instruction

Figure 34:
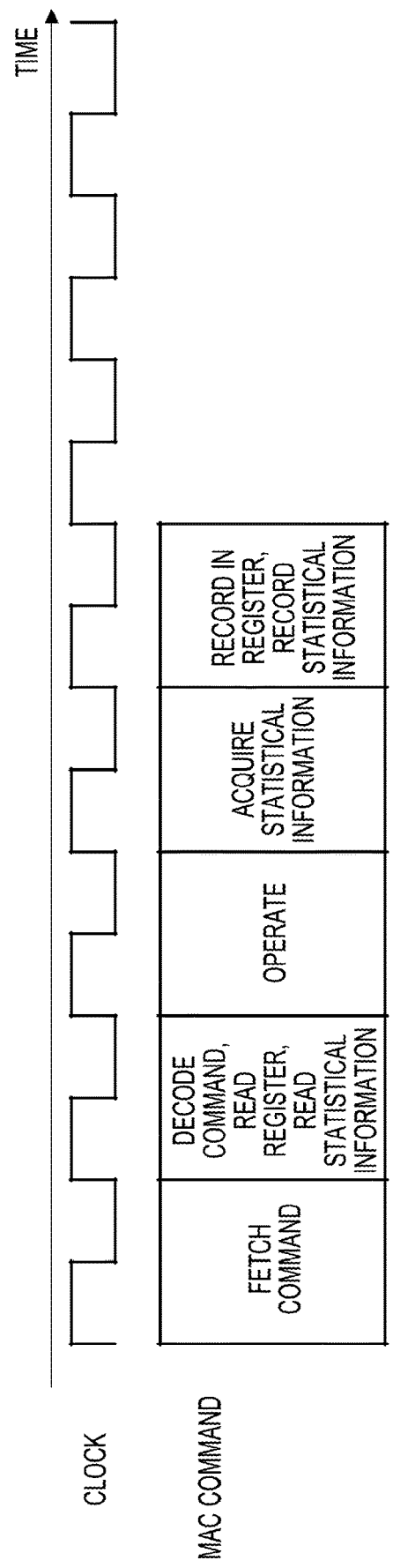
FIG. 34 is a diagram illustrating an execution time chart of a multiply-accumulate instruction and a statistical information acquisition processing by the processor of the first embodiment.

FIG. 34 illustrates an execution time chart of the multiply-accumulate operation instruction and the statistical information acquisition processing by the processor 10 of the first embodiment. In the drawing, one frame corresponds to a clock cycle CLOCK. In the processor 10 of the first embodiment, after the instruction is fetched, reading the data from the register and reading the statistical information from the register are executed in parallel with the decoder. Further, after the execution of the multiply-accumulate operation instruction (mac), the statistical information is acquired with one clock cycle and the statistical information is stored in parallel with the record of the multiply-accumulate operation result in the register.

Figure 35:
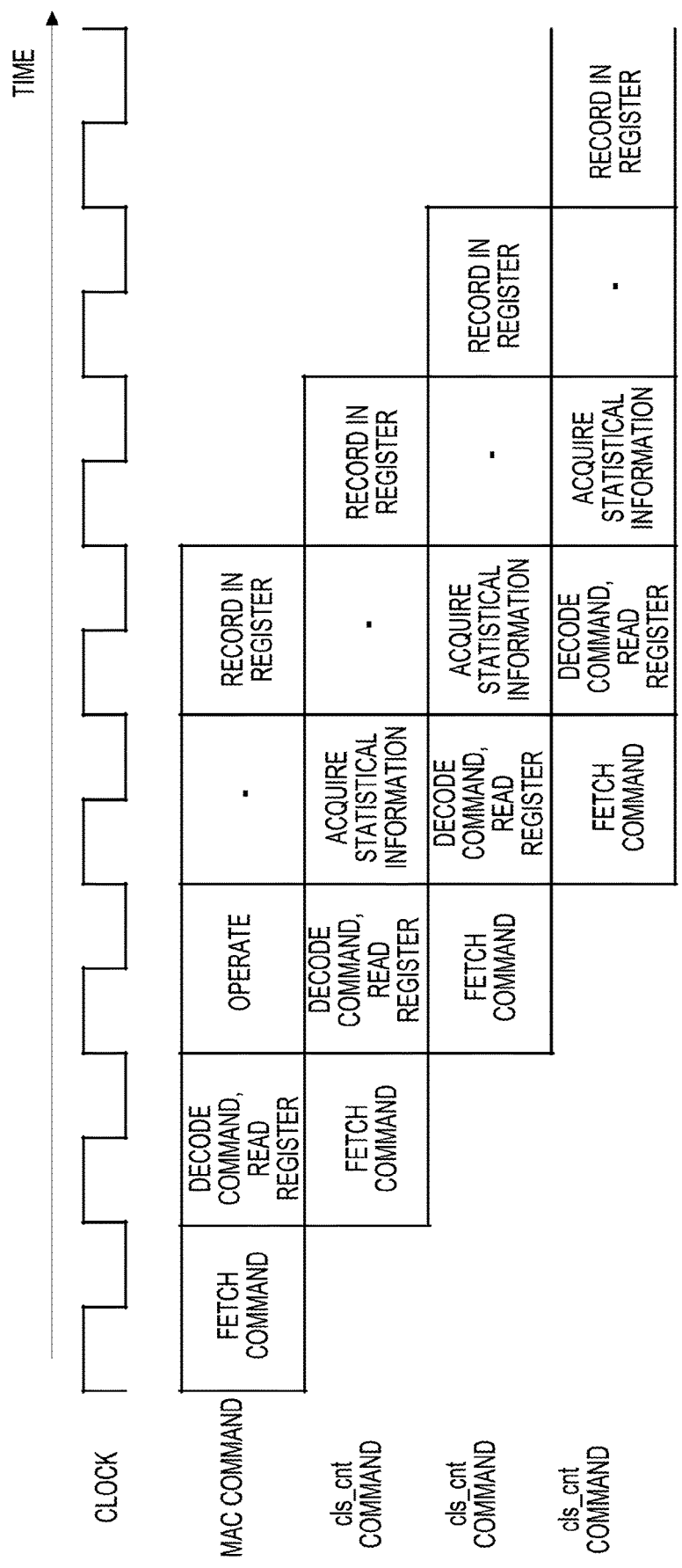
FIG. 35 is a diagram illustrating an execution time chart of a multiply-accumulate instruction and a statistical information acquisition processing by a processing circuit 10A of the second embodiment.

FIG. 35 illustrates a time chart of the execution of the multiply-accumulate operation instruction and the statistical information acquisition processing by the processing circuit 10A of the second embodiment. In the processing circuit 10A of the second embodiment, after the fetching of the multiply-accumulate operation instruction (mac) and the recording of the statistical information in the register are completed, the instruction fetch of the statistical information acquisition instruction cls_cnt, the decoding of the instruction and the reading of the data from the register, the acquisition of the statistical information, and the recording of the statistical information in the register are executed. Further, the target that acquires the statistical information with the instruction cls_cnt is referred to by using a register bypass for the operation result of an immediately preceding mac instruction. However, in the processing circuit 10A of the second embodiment, since the statistical information acquisition instruction cls_cnt is, for example, the processing of four bits at the bit position designated by the bit position designation N of the operand, the instruction is executed 10 times to acquire the statistical information of 40 bits.

Effect of Second Embodiment

As described above, the processing circuit 10A of the second embodiment acquires the statistical information for the bit distribution in the fixed point data from the accumulator registers ACC0 to ACC7 for the vector operation, from which the operation results for the fixed point data by the vector unit 13 are output. The acquired statistical information is output to the general purpose register vReg. Accordingly, the processing circuit 10A may acquire the statistical information by using the existing operation instruction and at least a part of circuits in common, thereby decreasing a circuit scale and acquiring the statistical information.

The processing circuit 10A may acquire the statistical information by commonly using the circuit that executes the existing operation instruction and at least a part of circuits by the 1-hot-vector converters HVC0 to HVC7, the population count circuits BPC0 to BPC3, and the adding circuit 108F by the statistical information acquisition instruction, thereby decreasing a circuit scale and acquiring the statistical information.

Herein, the existing adding circuit 108A is a circuit that executes the addition by the adding instruction of the decoder 112. Accordingly, in the second embodiment, the statistical information acquiring circuit 102 executes the processing by using the existing register, bus, and operational circuit that execute the existing instruction. Accordingly, the processing circuit 10A of the second embodiment may acquire and integrate the statistical information with a simple circuit configuration, compared to the processor 10 of the first embodiment.

More particularly, the bit population count circuits BPC0 to BPC3 acquire the operation result of the vector operational circuit 131 through the accumulator registers ACC0 to ACC7 for the vector operation and add the statistical information (the most significant bit position having a different value from the sign bit, and the like) at each bit position to generate the distribution of the statistical information. Further, the existing adding circuit 108A accumulates each bit of the generated statistical information in the destination register. Accordingly, the processing circuit 10A of the second embodiment may accumulate the statistical information with a simple circuit configuration, compared to the processor 10 of the first embodiment.

Herein, as the statistical information for the bit distribution, for example, the distribution of the most significant bit position having a different value (a non-sign bit) from the sign bit, and the distribution (cumulative distribution) of the bit string in which the position of the most significant bit having the different value from the sign bit to bit 0 are set to bit 1, are illustrated. Further, as the statistical information, the distribution of the least significant bit position having a different value from the sign bit, and the distribution (cumulative distribution) of the bit string in which the position of the least significant bit having the different value from the sign bit to the highest bit are set to bit 1, are illustrated. Accordingly, the processing circuit 10A may acquire the statistical information such as the number of times of the overflow and the number of times of the underflow.

When the processing circuit 10A acquires the distribution of the most significant bit position having the different value from the sign bit, the occurrence of the number of times of the overflow and the occurrence of the number of times of the underflow may be appropriately controlled.

When the processing circuit 10A acquires the cumulative distribution of the most significant bit position having the different value from the sign bit, the occurrence of the number of times of the overflow and the occurrence of the number of times of the underflow may be appropriately controlled.

The processing circuit 10A of the second embodiment and the information processing apparatus 1A including the plurality of processing circuits 10A may acquire the statistical information by the statistical information acquisition instruction and provide the acquired statistical information to the application program in at least one vector operation, similarly to the processor 10 of the first embodiment and the information processing apparatus 1 including the processor 10. Accordingly, the information processing apparatus 1A that executes the deep learning may rapidly and quickly adjust a fixed point position by the data converting circuit 103 based on the acquired statistical information.

The number of samples indicated by each digit of the cumulative distribution is the number of accumulated samples from the most significant digit (MSB) to each digit. Accordingly, the information processing apparatus 1A may calculate a ratio of the distribution to the entire cumulative distribution only by transferring the information on the number of samples of 1 digit and location information about the digit in a binary number. In order to calculate the ratio of the distribution to the entire cumulative distribution, the total number of samples of the entire cumulative distribution, which is a denominator, is required. However, the total number of samples of the entire cumulative distribution is known from the circuit configuration. For example, in one vector operation within the processing circuit 10A, the operation is executed by the number of parallel operations of the vector operational circuit. Accordingly, the total number of samples for one vector operation is the number of parallel operations of the vector operational circuit.

When the scalar operation is included in the total number of samples of the entire cumulative distribution, the number of times of the operation of each operational circuit, which is the target of the count of the cumulative distribution, may be accumulated. Accordingly, each processing circuit 10A may calculate a ratio (A %) of the distribution for the entire cumulative distribution from the structure of the operational circuit, and transmit the number of samples at the digit, in which the ratio of the distribution exceeds a predetermined threshold value (a predetermined overflow ratio and the like), to a higher device, for example, the host CPU 502 and the control CPU 503. The host CPU 502 and the control CPU 503 may adjust a decimal point position of each variable in the entire information processing apparatus 1A based on the number of samples of the digit transmitted from the processing circuit 10A. The method of adjusting the decimal point position of each variable is similar to the method of FIG. 24 of the first embodiment.

In the second embodiment, the statistical information acquiring circuit 102 executes the processing according to the statistical information acquisition instruction. In the statistical information acquisition instruction, a bit portion in the fixed point data is specified, and the statistical information of the specified bit portion is stored in the register. A program of a higher device that controls the processing circuit 10A may be acquired by selecting a bit portion in the statistical information in the statistical information acquisition instruction.

In the second embodiment, the information processing apparatus 1A includes the host CPU 502, the control CPU 503, and the plurality of processing circuits 10A. At least one of the host CPU 502 and the control CPU 503 instructs the execution of the processing as the control device. Accordingly, the information processing apparatus 1A may execute a more complex processing at a high speed, than the first embodiment.

Computer-Readable Recording Medium

A program that enables any function to be executed in a computer and other machines and devices (hereinafter, the computer and the like) may be recorded in a recording medium readable by the computer and the like. Further, the program of the recording medium is read and executed in the computer and the like, thereby providing the function thereof.

Herein, the recording medium readable by the computer and the like refers to a recording medium, which accumulates information of, for example, data and a program by an electric, magnetic, optical, mechanical, or chemical operation, and is readable by the computer. A recording medium detachable from the computer among the recording media includes, for example, a flexible disk, an optical magnetic disk, a CD-ROM, a CD-R/W, a DVD, a blue-ray disk, a DAT, an 8 mm-tape, and a memory card including a flash memory. Further, a recording medium fixed to the computer includes a hard disk and a read only memory (ROM). Further, a solid state drive (SSD) is a recording medium detachable from the computer, but is also used as a recording medium fixed to the computer.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiment(s) of the present disclosure has (have) been described in detail, it should be understood that the various changes, substitutions, and alterations could be made hereto without departing from the spirit and scope of the disclosure.

What is claimed is:
1. An operation processing apparatus comprising:
a memory; and
a processor coupled to the memory and configured to:
  execute an operation according to an operation instruction,
  acquire statistical information for a distribution of bits in fixed point data after an execution of an operation for the fixed point data according to an acquisition instruction, and
  output the statistical information to a register designated by the acquisition instruction.
2. The operation processing apparatus according to claim 1,
wherein the processor includes at least one of an operation circuit and a register.
3. The operation processing apparatus according to claim 1, wherein the processor is configured to:
  set a flag bit to a first position of a most significant bit, which does not match a sign bit in the fixed point data after execution of the operation, and
  set the flag bit to a second position of a least significant bit, which does not match the sign bit in the fixed point data after execution of the operation.
4. The operation processing apparatus according to claim 3, wherein the processor is configured to:
  execute a plurality of operations in parallel,
  add the flag bit set for a plurality of pieces of fixed point data, each of which is an operation result obtained by executing the operations in parallel, for each bit position, and accumulate the added flag bit for each bit position and the flag bit used in the operation instruction for each bit position.

5. The operation processing apparatus according to claim 1, wherein the processor is configured to:
set a flag bit to a first position of each bit corresponding to a first range from a lowest bit position to a most significant bit position among bit positions having different bit values from a sign bit for the fixed point data, and
set the flag bit to a second position of each bit corresponding to a second range from the highest bit position to the least significant bit position among the bit positions having different bit values from the sign bit.

6. The operation processing apparatus according to claim 1,
wherein the processor is configured to designate a bit portion of an acquisition target in the distribution of the bits in the fixed point data.

7. The operation processing apparatus according to claim 1,
wherein the statistical information is statistical information for the distribution of the bits of the fixed point data in an accumulator that maintains a multiply-accumulate operation result.

8. An information processing apparatus comprising:
a plurality of operation processing apparatuses, each of which includes a memory and a processor coupled to the memory, the processor configured to:
execute an operation according to an operation instruction,
acquire statistical information for a distribution of bits in fixed point data after an execution of an operation for the fixed point data according to an acquisition instruction, and
output the statistical information to a register designated by the acquisition instruction; and
a control circuit configured to instruct the plurality of operation processing apparatuses to execute processing.

9. The information processing apparatus according to claim 8,
wherein each of the processors included in the plurality of operation processing apparatuses shares at least one common operation circuit or at least one common register.

10. An information processing method executed by a processor included in an information processing apparatus, the method comprising:
executing an operation according to an operation instruction;
acquiring statistical information for a distribution of bits in fixed point data after an execution of an operation for the fixed point data according to an acquisition instruction; and
outputting the statistical information to a register designated by the acquisition instruction.

11. The method according to claim 10,
wherein the executing an operation and the acquiring statistical information are executed by using at least one of a common operation circuit and a common register.

12. A non-transitory computer-readable recording medium storing a program that causes a processor included in an information processing apparatus to execute a process, the process comprising:
executing an operation according to an operation instruction;
acquiring statistical information for a distribution of bits in fixed point data after an execution of an operation for the fixed point data according to an acquisition instruction; and
outputting the statistical information to a register designated by the acquisition instruction.

13. The recording medium according to claim 12,
wherein the executing an operation and the acquiring statistical information are executed by using at least one of a common operation circuit and a common register.

* * * * *